US011427249B2

(12) United States Patent
Doerksen et al.

(10) Patent No.: US 11,427,249 B2
(45) Date of Patent: Aug. 30, 2022

(54) CONTROL SYSTEM FOR A TILTABLE VEHICLE

(71) Applicant: Sway Motorsports LLC, Soquel, CA (US)

(72) Inventors: Kyle Doerksen, Santa Cruz, CA (US); Joseph Wilcox, Palo Alto, CA (US)

(73) Assignee: Sway Motorsports LLC, Soquel, CA (US)

( * ) Notice: Subject to any disclaimer, the term of this patent is extended or adjusted under 35 U.S.C. 154(b) by 145 days.

(21) Appl. No.: 16/707,368

(22) Filed: Dec. 9, 2019

(65) Prior Publication Data

US 2020/0114966 A1    Apr. 16, 2020

Related U.S. Application Data

(63) Continuation of application No. 16/192,607, filed on Nov. 15, 2018, now Pat. No. 10,501,119.

(Continued)

(51) Int. Cl.
| | |
|---|---|
| *B62D 9/02* | (2006.01) |
| *B62K 5/10* | (2013.01) |
| *B62K 5/08* | (2006.01) |
| *B60G 17/018* | (2006.01) |
| *B60G 17/016* | (2006.01) |
| *B62J 45/414* | (2020.01) |

(Continued)

(52) U.S. Cl.
CPC ............. *B62D 9/02* (2013.01); *B60G 17/018* (2013.01); *B60G 17/0162* (2013.01); *B62J 45/414* (2020.02); *B62K 5/08* (2013.01); *B62K 5/10* (2013.01); *B60G 2200/144* (2013.01);

*B60G 2202/442* (2013.01); *B60G 2300/122* (2013.01); *B60G 2300/45* (2013.01); *B60G 2500/40* (2013.01); *B60G 2800/24* (2013.01); *B60G 2800/912* (2013.01); *B60G 2800/963* (2013.01); *B62K 5/027* (2013.01); *B62K 5/05* (2013.01)

(58) Field of Classification Search
CPC .................................. B62D 9/02; B62K 5/10
See application file for complete search history.

(56) References Cited

U.S. PATENT DOCUMENTS

| | | | |
|---|---|---|---|
| 7,438,346 B1 | 10/2008 | Breed | |
| 7,487,985 B1* | 2/2009 | Mighell | ................. B62K 5/027 |
| | | | 180/210 |

(Continued)

FOREIGN PATENT DOCUMENTS

| | | |
|---|---|---|
| CA | 3005022 A1 | 5/2017 |
| JP | 2013-107581 A | 6/2013 |
| WO | 2014/145878 A1 | 9/2014 |

*Primary Examiner* — James A English
(74) *Attorney, Agent, or Firm* — Kolitch Romano LLP

(57) ABSTRACT

A vehicle of the present disclosure may include at least one pair of opposing wheels coupled to a tiltable central chassis by a four-bar linkage or the like, such that the wheels are configured to tilt in unison with the central chassis. A steering actuator and/or a tilting actuator may be discretely controllable by an electronic controller of the vehicle. The controller may include processing logic configured to maintain alignment between a median plane of the chassis and a net force vector caused by gravity and any induced centrifugal forces. Various control algorithms may be utilized to steer the vehicle along a desired path, either autonomously or semi-autonomously.

12 Claims, 20 Drawing Sheets

Related U.S. Application Data

(60) Provisional application No. 62/615,372, filed on Jan. 9, 2018, provisional application No. 62/587,984, filed on Nov. 17, 2017, provisional application No. 62/586,851, filed on Nov. 15, 2017.

(51) Int. Cl.
*B62K 5/027* (2013.01)
*B62K 5/05* (2013.01)

(56) References Cited

U.S. PATENT DOCUMENTS

| | | | | |
|---|---|---|---|---|
| 7,631,721 B2* | 12/2009 | Hobbs | ............... | B60G 21/007 |
| | | | | 180/348 |
| 9,555,849 B1 | 1/2017 | Abbott | | |
| 2007/0126199 A1* | 6/2007 | Peng | ............... | B60G 21/007 |
| | | | | 280/124.103 |
| 2010/0044977 A1* | 2/2010 | Hughes | ............... | B60G 21/007 |
| | | | | 280/5.509 |
| 2011/0006498 A1* | 1/2011 | Mercier | ............... | B62K 5/10 |
| | | | | 280/124.103 |
| 2011/0209929 A1* | 9/2011 | Heinzmann | ......... | B62K 11/007 |
| | | | | 180/6.2 |
| 2012/0181765 A1* | 7/2012 | Hill | ............... | B62K 5/027 |
| | | | | 280/62 |
| 2013/0062133 A1 | 3/2013 | Budweil | | |
| 2014/0124286 A1 | 5/2014 | Hayashi | | |
| 2014/0125027 A1* | 5/2014 | Rhodig | ............... | B62K 5/01 |
| | | | | 280/124.103 |
| 2014/0312580 A1* | 10/2014 | Gale | ............... | B62D 9/02 |
| | | | | 280/5.509 |
| 2015/0175184 A1 | 6/2015 | Yadan | | |
| 2015/0210338 A1 | 7/2015 | Iizuka | | |
| 2018/0057050 A1* | 3/2018 | Takenaka | ............... | B60G 9/04 |
| 2018/0158018 A1 | 6/2018 | Luckay | | |
| 2018/0281886 A1 | 10/2018 | Mizuno | | |
| 2018/0298670 A1 | 10/2018 | Shomsky | | |
| 2018/0334001 A1 | 11/2018 | Kato | | |

* cited by examiner

CONTROL SYSTEM FOR A TILTABLE VEHICLE

CROSS-REFERENCES

This application claims the benefit under 35 U.S.C. § 119(e) of the priority of U.S. Provisional Patent Application Ser. No. 62/586,851 (filed on Nov. 15, 2017), Ser. No. 62/587,984 (filed on Nov. 17, 2017), and Ser. No. 62/615,372 (filed on Jan. 9, 2018), the entireties of which are hereby incorporated by reference for all purposes.

FIELD

This disclosure relates to systems and methods for automatically or semi-automatically controlling a tiltable vehicle.

INTRODUCTION

Currently, most of the motor vehicles that are on the highways are four-wheeled vehicles that tend to be larger, heavier and, as a result less, fuel-efficient than three-wheeled motor vehicles. Despite the fact that four-wheeled vehicles may be seen to enjoy more widespread use and acceptance, there are several advantages that are provided by modern three-wheeled vehicles. For example, under most circumstances three-wheel vehicles are, by their nature, more stable than four-wheeled vehicles due to the fact that three contact points will form a plane under all circumstances, whereas four contact points will not. Another advantage is that three-wheeled vehicles afford a nearly ideal wheel loading distribution for maximum tire traction in both acceleration and braking situations.

Despite the advantages that three-wheeled vehicles enjoy over four-wheeled vehicles, the main drawback of a three-wheeled vehicle is that during a turn, rather than having two outside wheels in contact with the road surface, the three-wheeled vehicle only has a single outside wheel that must bear the entire centrifugal load generated by the vehicle while negotiating the turn. In this regard, the centrifugal force tends to overload the outside tire causing the vehicle to slip out of the direction of the turn unless some additional means of force compensation is provided. Further, the three-wheeled vehicle geometry allows the force vector associated with the vehicle's center of gravity to quickly fall outside the wheelbase of the vehicle causing an unstable condition and increasing the possibility of overturning the vehicle, and, in the case of a single rear-wheel drive, losing traction on the rear wheel and entering a skid. To make this condition worse, as the center of gravity of the vehicle (including an operator and any load being carried by the vehicle) raises higher, the potential for vehicle instability and overturning becomes much greater.

The ability to overcome the aforementioned handling problems in three-wheeled vehicles becomes even more important as more emphasis is placed upon alternative fuel and/or hybrid vehicles with heavy battery loads, and as the demand for self-driving or semi-autonomous vehicles and mobile robotic systems rises.

Accordingly, there is a need for a control system for a tilting vehicle that automatically maintains and enhances stability and handling characteristics.

SUMMARY

The present disclosure provides systems, apparatuses, and methods relating to control systems for dynamically tiltable vehicles.

In some embodiments, a vehicle may include: a pair of wheels coupled to a tiltable central frame by a four-bar linkage configured such that the pair of wheels and the central frame are configured to tilt in unison with respect to a median plane of the central frame; a sensor configured to detect directional information regarding a net force vector applied to the central frame, wherein the net force vector is determined by gravity in combination with any applicable centrifugal force applied to the central frame; a first actuator operatively coupled to the central frame and configured to selectively tilt the central frame; a second actuator operatively coupled to the pair of wheels and configured to selectively steer the pair of wheels; a controller including processing logic configured to selectively control the first actuator and the second actuator in response to the directional information from the sensor to automatically maintain the net force vector in alignment with the median plane of the central frame.

In some embodiments, a method for automatically operating a tiltable vehicle may include: sensing a net force vector on a central chassis of a wheeled vehicle, the central chassis coupled to a pair of laterally disposed wheels by a four-bar linkage assembly, wherein the central chassis is tiltable from side to side and the four-bar linkage assembly is configured to tilt the wheels in unison with the central chassis, and wherein the central chassis defines a median plane; in response to receiving information relating to a desired travel path, comparing a speed of the vehicle to a first threshold and a second threshold greater than the first threshold; and in response to the speed of the vehicle being less than the first threshold, turning the vehicle by simultaneously and automatically steering the wheels and causing a tilting of the central chassis, such that a misalignment between the net force vector and the median plane is minimized.

Features, functions, and advantages may be achieved independently in various embodiments of the present disclosure, or may be combined in yet other embodiments, further details of which may be seen with reference to the following description and drawings.

DETAILED DESCRIPTION

Figure 1:
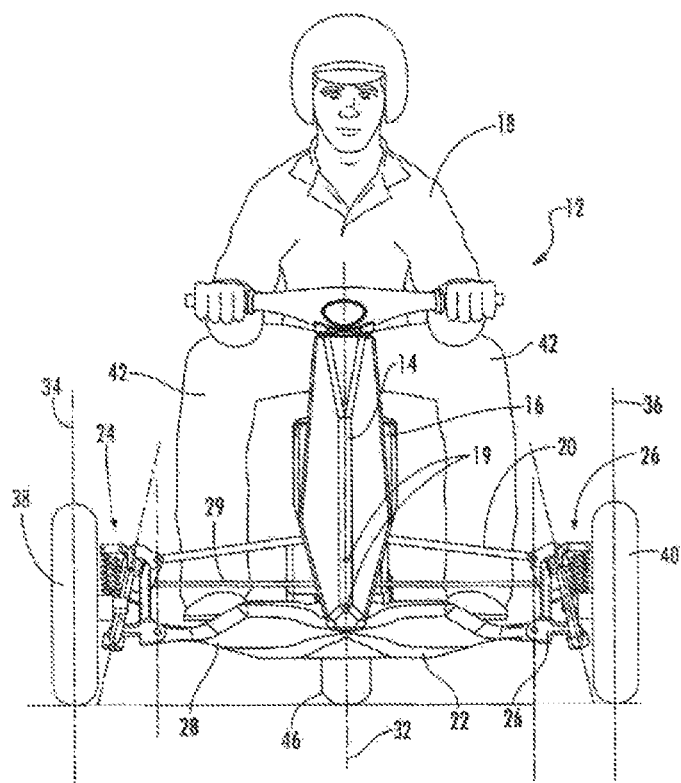
FIG. 1 is a front view of a rider on an illustrative tiltable vehicle, in accordance with aspects of the present teachings.

Various aspects and examples of a vehicle having automated tilt and/or steering controls, as well as related methods, are described below and illustrated in the associated drawings. Unless otherwise specified, a vehicle in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A and B, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, category, or the like, and are not intended to show serial or numerical limitation.

"AKA" means "also known as," and may be used to indicate an alternative or corresponding term for a given element or elements.

The terms "inboard," "outboard," "forward," "rearward," and the like are intended to be understood in the context of a vehicle or host vehicle (if describing a component). For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "aft" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

Directional terms such as "up," "down," "vertical," "horizontal," and the like should be understood in the context of the particular vehicle being described, in its normal operating configuration. For example, a vehicle may be oriented around defined X, Y, and Z axes. In those examples, the X-Y plane will define horizontal, with up being defined as the positive Z direction and down being defined as the negative Z direction. In general, as used herein, the Z axis will be aligned with the force due to gravity.

"Coupled" means connected, either permanently or releasably, whether directly or indirectly through intervening components, and (depending on the context) is not necessarily limited to physical connection(s).

"Resilient" describes a material or structure configured to be deformed elastically under normal operating loads (e.g., when compressed) and to return to an original shape or position when unloaded.

"Rigid" describes a material or structure configured to be stiff, non-deformable, or substantially lacking in flexibility under normal operating conditions.

"Processing logic" may include any suitable device or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

Overview

In general, a vehicle of the present teachings may include at least one pair of tiltable wheels and a control system having processing logic configured to automatically tilt the chassis of the vehicle and in some cases actively steer the wheels of the vehicle to guide the vehicle down a selected path while maintaining a median plane of the vehicle chassis in alignment with a net force vector resulting from gravity and centrifugal force (if any). The vehicle may be of any suitable design configured to result in a coordinated and substantially identical tilting of the chassis and the wheels. For example, a steering or suspension system of the vehicle may comprise a four-bar parallelogram linkage, coupling the left and right wheels to a central chassis. Examples of this type of vehicle are described below. In some cases, the vehicle may comprise a robotic vehicle, a semi-autonomous vehicle, or a fly-by-wire vehicle.

Methods and systems of the present disclosure may, for example, provide for the delivery of articles, objects, products, or goods from one location to another location using the wheeled vehicle. Control methods may be computer implemented, either partially or totally. As described above, the wheeled vehicle may optionally be remotely controlled, semiautonomous, or mixed autonomous. The vehicle may optionally be one or a plurality of wheeled vehicles, for example one of a plurality of identical wheeled vehicles. In some embodiments, the wheeled vehicle may optionally be a driverless wheeled vehicle, which may be referred to as driverless vehicle or robot, an autonomous vehicle or robot, an autonomous wheeled vehicle or robot or any combination of such terms. The system of the present disclosure may be referred to as a wheeled vehicle or robotic delivery system, a driverless vehicle or robotic delivery system, an autonomous vehicle or robotic delivery system, a driverless or autonomous delivery system or any combination of the foregoing. The method and system of the present disclosure may optionally be used on an indoor or an outdoor land transportation network, which may include roads, bike paths, sidewalks, alleys, paths, crosswalks, any route on which a wheeled vehicle may travel or any combination of the foregoing. The transportation network of the present disclosure may be referred to as an outdoor network, an outdoor transportation network, a land transportation network, or the like.

Electromechanically controllable variables of the vehicle may include chassis tilt with respect to the wheel linkage, steering of the wheels, throttle or vehicle speed, and braking. In general, the control system is configured to keep centrifugal and gravitational forces in equilibrium when turning, so that the combined centrifugal and gravitational vectors create a net force vector parallel to the chassis and wheel median planes. By directing the combined forces parallel to the chassis, stress on the vehicle suspension components (as well as riders where applicable) is reduced, rollover risk is decreased, and traction in a turn is improved or maximized.

The ideal leaning position of the chassis may be achieved through a combination of actuators and control software to create the desired performance. In some examples, tilt and steering angles are discretely controlled for a given turn. In general, the tilt to steer ratio is controlled, depending on speed and terrain, and higher speed leads to more vehicle chassis lean, less wheel steering. The tilt experienced at the chassis is a sum of the angle of the road surface plus the angle of the wheel linkage articulation. Detecting the level of the surface (or the chassis tilt displacement to correct) could in some cases be done using a suitable sensor near the road surface. However, it may be more effective to determine and maintain the absolute tilt angle of the chassis by measuring its relationship to the net force vector caused by gravity and any centrifugal forces.

In some cases, the interaction of crowned tires with the terrain must be accounted for, as the crowned shape of some wheels may produce scrub when tracking along the side of the wheel in a given turn vector over uneven or slanted terrain. For tilting three wheeled vehicles, understeering or oversteering may be needed, depending on terrain, to counter the natural effect of the crowned wheel to oversteer or understeer into the turn. Generally speaking, this tire scrub is preferable to loss of the desired path of the vehicle.

Aspects of control systems described herein may be embodied as processing logic including a computer method, computer system, or computer program product. Accordingly, aspects of the control systems may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the control systems may take the form of a computer program product embodied in a computer-readable medium (or media) having computer-readable program code/instructions embodied thereon.

Any combination of computer-readable media may be utilized. Computer-readable media may be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a solid state memory, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that may contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the control systems may be written in one or any combination of programming languages, including an object-oriented programming language such as Java, C++, and/or the like, and conventional procedural programming languages, such as C. Mobile apps may be developed using any suitable language, including those previously mentioned, as well as Objective-C, Swift, C #, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of control systems are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

These computer program instructions may also be stored in a computer-readable medium that may direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions may also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the control systems. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of exemplary vehicles and control systems, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Vehicles and Controls

As shown in FIGS. 1-26, this section describes illustrative tiltable vehicles and associated electromechanical controls. These vehicles are examples of the tiltable vehicle and related controls described in the Overview above.

Figure 2:
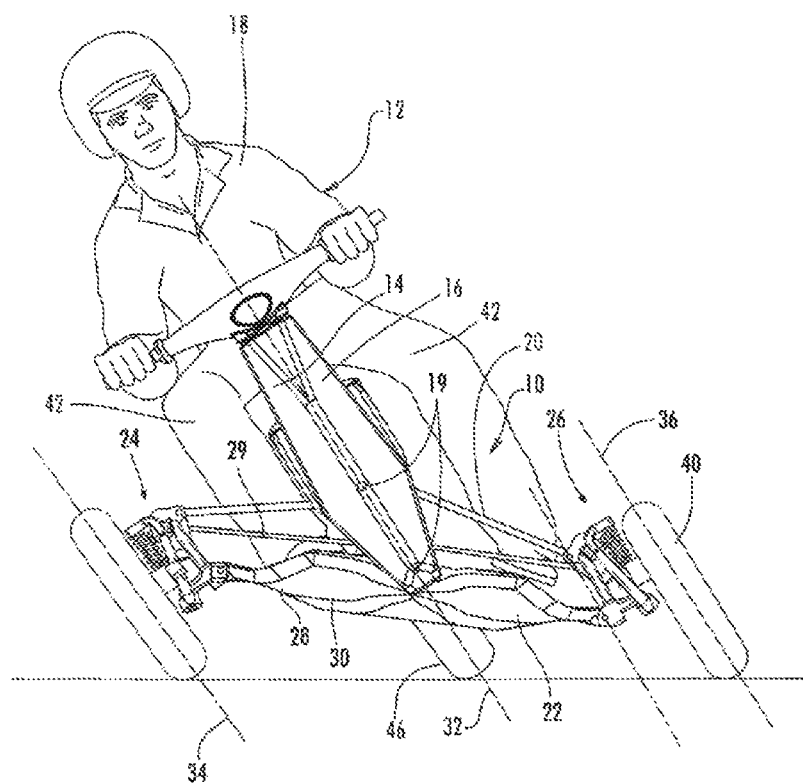
FIG. 2 is a front elevation view of the vehicle of FIG. 1, tilted with respect to a median plane of the vehicle.

With reference to FIGS. 1-2, a three-wheeled tilting vehicle 12 is shown and generally illustrated with a wheel linkage assembly 10 installed at a front end (also referred to as a suspension assembly). Vehicle 12 is depicted in an upright (see FIG. 1) and a tilted (see FIG. 2) position and is depicted in the context of a wheeled vehicle. Vehicle 12 includes a central frame 14 (AKA chassis) having a front, a rear, and a support portion 16 for a rider 18. Front wheel linkage assembly 10 may be attached to the front of the central frame 14 at pivots 19. Front wheel linkage assembly 10 includes a top suspension bar 20 and a bottom suspension bar 22, each of which has a respective left end and right end. Wheel linkage assembly 10 further includes a left suspension bar 24 and a right suspension bar 26 each having respective top and bottom ends.

The geometry of wheel linkage assembly 10 is arranged such that the left ends of top and bottom suspension bars 20, 22 are pivotally attached to the respective top and bottom ends of left suspension bar 24 and the right ends of top and bottom suspension bars 20, 22 are pivotally attached to the respective top and bottom ends of right suspension bar 26 at pivots 17. Accordingly, top and bottom suspension bars 20, 22 are substantially parallel to one another and left and right suspension bars 24, 26 are substantially parallel to one another. A central portion of the top and bottom suspension bars are pivotally affixed to the front of central frame 14. As described above, the geometry of wheel linkage assembly 10 is implemented as a four-bar linkage. Specifically, the four suspension bars 20, 22, 24, 26 of assembly 10 are arranged in a parallelogram shape wherein top and bottom suspension bars 20, 22 are substantially parallel along the top and bottom of the suspension assembly and left and right suspension bars 24, 26 are substantially parallel to one another along the left and right sides of the suspension assembly. The ends of each of the suspension bars 20, 22, 24, 26 are pivotally attached to one another to form a hinged parallelogram.

In some examples, such as the one depicted in FIGS. 1 and 2, bottom suspension bar 22 may be enlarged in depth and extended rearwardly to form a storage compartment 28 that provides storage capacity for installation of heavy items such as battery banks 30 to preserve a lowered center of gravity for vehicle 12. In this manner, storage compartment 28 provides a location for the placement of batteries 30 that power vehicle 12 in a relatively low position to enhance the stability and lower the center of gravity. In particular, because bottom suspension bar 22 (in this example) does not tilt relative to central frame 14, the weight of batteries 30 is removed from the tilting aspects of the suspension assembly. As a result, the tilting mass of vehicle 12 remains light and nimble. This allows vehicle 12 to have lightweight handling response and overall feel while still carrying a substantial battery load.

Vehicle 12 is a pivoting vehicle having a first vertical axis 32 of central frame 14 defining a median plane dividing the frame or chassis into left and right portions, as well as second and third vertical axes 34, 36 running through each of two spaced tires 38, 40 (AKA wheels). These three axes are configured to remain parallel as vehicle 12 tilts. Legs 42 of user 18 may be used in some examples to control the tilt of vehicle 12, although automated examples (in some cases unmanned) are described below. Whether the vehicle has two, three, four, or more wheels, central frame 14 is coupled to at least two wheels 38, 40 that tilt as central frame 14 tilts (i.e., in unison), so that these elements remain in their parallel orientation with respect to the axes just defined.

The arrangement of the present example facilitates the free-leaning performance of a motorcycle without the need for a high level of traction between the tires and the travel surface for the vehicle to remain upright. As a result, the vehicle may be operated on snow, ice, dirt, etc., more safely. Generally, travel surface interfaces (e.g., tires, skis, treads, etc.) for traveling over a surface 44 are affixed to left and right suspension bars 24, 26 and to the rear of central frame 14 to allow vehicle 12 to be operated on surface 44. In the example depicted, a three-wheeled vehicle 12 has travel surface interfaces in the form of a single rear drive wheel 46 and two forward wheels 38, 40. However, it should be appreciated by one skilled in the art that the teachings of the present disclosure apply to a two- or four-wheeled vehicle, as well as to water craft operating on pontoons or snow vehicles operating on skis.

To facilitate steering of vehicle 12, wheel linkage assembly 10 includes front wheels 38, 40 mounted to respective spindles 48 that are pivotally coupled to left and right suspension bars 24, 26 and connected tire rods 29. As vehicle 12 is tilted, spindles 48 and wheels 38, 40 mounted to the left and right suspension bars 24, 26 at pins 17 also tilt to maintain the geometry of the parallelogram. In this respect, as vehicle 12 is tilted, left and right wheels 38, 40 are also tilted and remain in a substantially parallel relation to central frame 14. In addition, however, the ability to pivot wheel spindles 48 relative to wheel linkage assembly 10 on bearings 25 allows wheels 38, 40 to be turned to facilitate cornering of vehicle 12.

In some examples, the four-bar linkage of wheel linkage assembly 10 is coupled onto the front end of a motorized version of vehicle 12, such as a moped, electric bike, or motorcycle. In this manner, rear wheel 46 serves as the drive wheel and the front wheel is replaced with wheel linkage assembly 10 and front wheels 38, 40. In this configuration, spindles 48 for front wheels 38, 40 are mounted to left and right suspension bars 24, 26 in a manner that allows spindles 48 and wheels 38, 40 to pivot around the axis of left and right suspension bars 24, 26. Moreover, spindles 48 are interconnected by an assembly including a tie rod that is also connected to a steering, linkage thereby allowing the user (or an automated controller) to steer vehicle 12. To further assist in stabilizing vehicle 12, front wheels 38, 40 may have at least a small amount of caster to the rear of the wheel linkage assembly 10 to facilitate self-centering of the steering and a slight amount of camber to urge vehicle 12 to a normal upright position.

Figure 3:
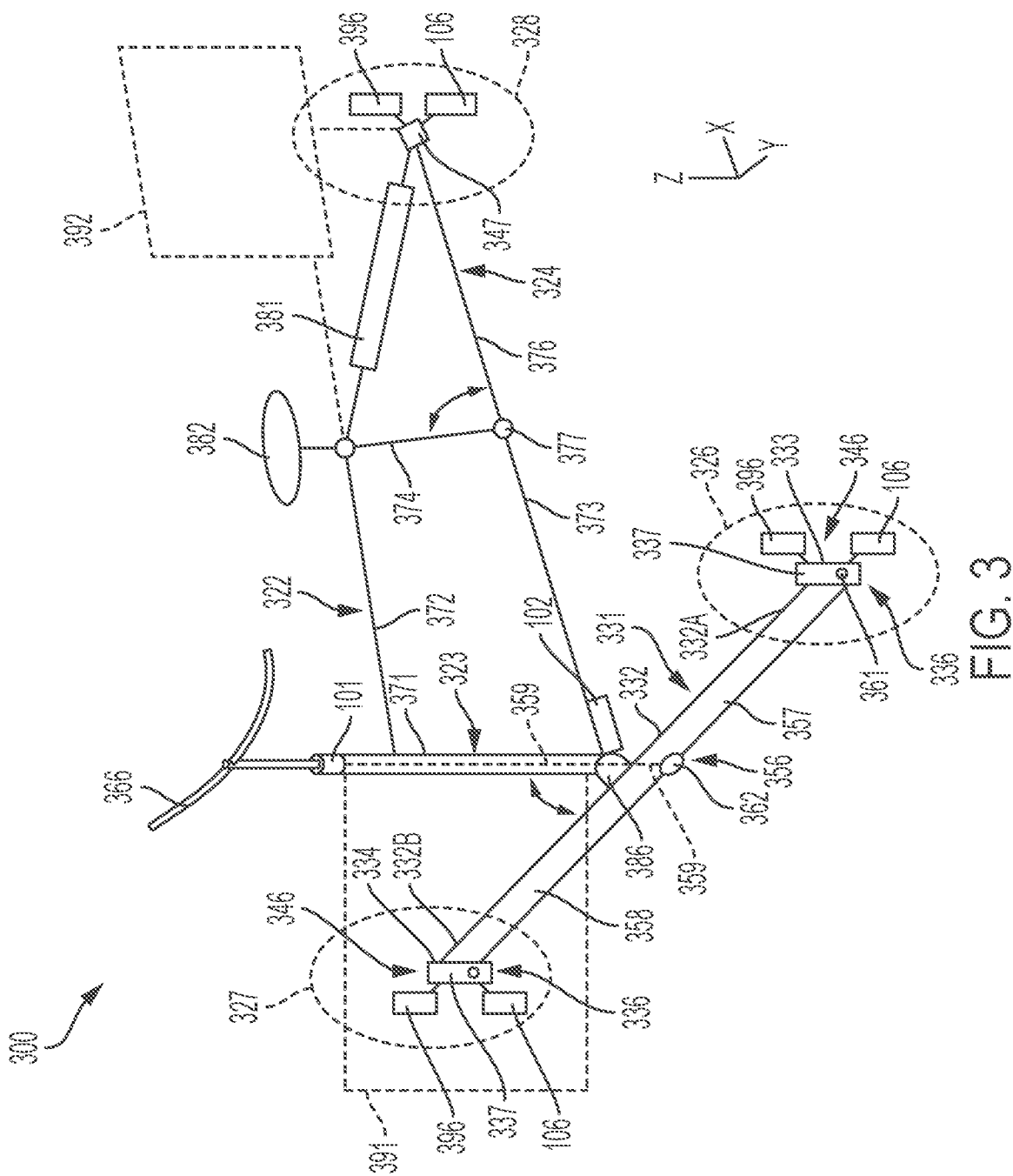
FIG. 3 is a schematic view of another illustrative tiltable vehicle, in accordance with aspects of the present teachings.

An illustrative wheeled vehicle 300 similar to vehicle 12 is depicted schematically in FIG. 3. Wheeled vehicle 300 includes a chassis 322 (AKA a frame) having a first end 323 and an opposite second end 324. One or more wheels are rotatably coupled to first end 323 of chassis 322, and one or more wheels are rotatably coupled to second end 324 of chassis 322. In some embodiments, first and second wheels 326, 327 are rotatably coupled to first end 323 and a single wheel 328 is rotatably coupled to second end 324. First end 323 may be the front or rear of vehicle 300, and in some embodiments the first end is the front end of the vehicle. In some embodiments, first and second wheels 326, 327 are the front left wheel and front right wheel, respectively, of wheeled vehicle 300.

A suspension assembly 331 (AKA wheel assembly, wheel linkage, linkage assembly) is provided for coupling first and second wheels 326, 327 to chassis 322. Suspension assembly 331 may include any suitable linkage. In some examples, suspension assembly 331 includes a crossmember 332 having a first or left end 332A and a second or right end 332B. A first bracket 333 is connected to first end 332A of crossmember 332 and a second bracket 334 is connected to second end 332B of crossmember 332. Crossmember 332 and brackets 333, 334 may be made from any suitable material, such as a metal, and brackets 333, 334 may be welded or otherwise rigidly secured to crossmember 332.

First and second wheels 326, 327 are pivotably coupled to respective ends of suspension assembly 331. In some embodiments, a pivot assembly 336 is provided at each end of suspension assembly 331 for coupling wheels 326, 327 to the suspension assembly. Pivot assemblies 336 facilitate rotation of wheels 326, 327 in a manner that facilitates turning and/or steering of the wheels relative to suspension assembly 331 (e.g., about respective vertical or Z pivot axes). In some embodiments, each pivot assembly 336 includes a spindle axle 337 pivotably coupled to the respective bracket 333, 334, e.g., by a pivot pin or bolt extending through the spindle axle and connected at each end to the respective bracket. A nut and/or any other suitable fastener may be provided for coupling to one end of the pivot pin for securing the pivot pin to the respective bracket 333, 334.

First and second wheels 326, 327 are rotatably coupled to respective ends of suspension assembly 331. In some embodiments, a suitable wheel rotation assembly 346 is provided at each end of suspension assembly 331 for coupling wheels 326, 327 to the suspension assembly in any manner that permits rotation of the wheels relative to the suspension assembly, for example about a horizontal (Y) axis, perpendicular to the vertical (Z) pivot axis of the wheel. Each wheel rotation assembly 346 may include an axle, a bearing, and/or any other suitable mechanism for permitting rotation of the wheel on a vehicle.

Wheeled vehicle 300 may include any suitable steering mechanism or assembly 356 for causing each of first and second wheels 326, 327 to pivot about their respective ends of suspension assembly 331 to permit steering of vehicle 300. Suitable steering mechanisms 356 include known assemblies or mechanisms for steering automobiles, trucks, and/or any other vehicles suitable for traveling on transportation networks of any type. In some embodiments, steering assembly 356 includes first and second steering rods 357, 358 (AKA tie rods or pivot rods or arms), which are coupled to a steering shaft 359 such that rotation of steering shaft 359 causes steering rods 357, 358 to move laterally relative to the steering shaft and cause wheels 326, 327 to pivot substantially in unison about their respective pivot axes. In some embodiments, each of steering rods 357, 358 has an outer end pivotably coupled to the respective spindle axle 337, e.g., to an arm 361 of the axle, and an inner end coupled to the lower or bottom end of steering shaft 359. Longitudinal movement of one of the steering rods 357, 358 causes the respective arm 361 to rotate the respective spindle axle 337 about its pivot axis. In some embodiments, the bottom end of the steering shaft includes a coupling bracket 362 extending perpendicularly with respect to shaft 359 and having first and second spaced-apart attachment mechanisms pivotably coupled to the inner end of the first and second steering rods 357, 358. Steering mechanism 356 may include any other suitable known mechanisms, such as rack and pinion assemblies, etc., for causing the first and second steering rods 357, 358 to move longitudinally in opposite first and second directions upon rotation of steering shaft 359. A steering handlebar or wheel 366, or any other suitable human hand-grippable element, may be secured to steering shaft 359 for permitting a human driver to operate steering mechanism 356.

Chassis 322 includes a neck or stem 371 (AKA steering tube) at front end 323 of the chassis. Steering shaft 359 is rotatably carried by stem 371, e.g., by a rotational joint or assembly that may include one or more bearings. A top tube 372 extends rearwardly from the top end of stem 371, and a bottom tube or downtube 373 extends rearwardly from the bottom end of stem 371. A center post or seat tube 374 is joined to the respective rear ends of each of top tube 372 and bottom tube 373. Rear wheel 328 is rotatably coupled to second or rear end 324 of chassis 322. For example, a bottom arm or fork 376, which may be referred to as a soft tail, may be pivotably coupled to the rear of seat tube 324, e.g., at the bottom end of the seat tube, by a pivot assembly 377 configured to pivot about a horizontal (Y) axis. A wheel rotation assembly 347 is disposed at the end of fork 376 for coupling wheel 328 to rear end 324 of chassis 322. A spring and/or any other suitable deflecting suspension member 381 may be included in vehicle 300 for dampening and/or restricting pivoting of fork 376 about pivot assembly 377. In some embodiments, spring 381 has a first end coupled to the center portion of chassis 322 (e.g., to the top end of seat tube 374) and an opposite second end coupled to the free end of fork 376 (e.g., adjacent rear wheel rotation assembly 347). A seat 382 for permitting a human operator to sit on vehicle 300 may also be provided.

Chassis 322 is tiltable side to side about an axis (e.g., a horizontal (X) axis), so as to be tiltable relative to the surface on which the vehicle is traveling (i.e., to the left and right). In some examples, chassis 322 may be secured to suspension assembly 331 in a manner that permits chassis 322 to pivot or tilt relative to the suspension assembly, and thus relative to front wheels 326, 327. In some examples, chassis 322 is pivotably coupled by a pivot assembly 386 joined to the center of suspension assembly 331 (e.g., at crossmember 332) and the bottom of stem 371 of the chassis. Pivot assembly 386 may be referred to as a rotational joint or tilt rotational joint. Pivot assembly 386 permits stem 371 to pivot about a horizontal (X) axis. Such pivoting and/or tilting of chassis 322 may compensate for lateral accelerations and/or centrifugal forces exerted on chassis 322 and any driver during operation of vehicle 300 (see below). Such lateral accelerations and/or centrifugal forces may occur, for example, during turning of vehicle 300.

Wheeled vehicle 300 may include one or more containers for storing and/or transporting goods. As an example, a first container 391 is shown in dashed lines in FIG. 3, coupled to the front of chassis 322, and a second container 392 is shown in dashed lines coupled to the rear of chassis 322.

Vehicle 300 may optionally include at least one mechanism, assembly, apparatus, and/or device of any suitable type, which may optionally be carried by one of the containers, for removing or assisting in the removal of the contents of the container, for moving articles between containers, for placing or moving or assisting in the placement or movement of articles into the container, or any combination the foregoing. The at least one mechanism may include a crane, a pickup or other arm, a scoop, a shovel, a pulley, a claw, a magnet, a conveyor, a belt, rollers, balls, a movable surface, a movable wall, a slide, a grasping device, and/or any combination the foregoing. The at least one transport mechanism may optionally be inside one of the containers.

Wheel 326, wheel 327, and/or wheel 328 may be driven by one or more motors or drive actuators 396, which may optionally be controlled by a controller for moving wheeled vehicle 300. In some embodiments, a plurality of wheels are driven by one or more motors, or are motorized. In some embodiments, front wheel 326 and front wheel 327 are driven by one or more motors, for example by one respective motor for each wheel. In some embodiments, all of the wheels of wheeled vehicle 300 are driven by one or more respective motors, or motorized. The foregoing motors or drive actuators may each be of any suitable type, for example an electric motor or actuator. In some embodiments, each of the wheels is internally powered by an electric motor or actuator, e.g., a hub motor, a scooter hub motor, a wheel motor, a wheel hub drive, and/or another in-wheel motor of any suitable type. Vehicle 300 may be powered by a single actuator or motor, e.g., an electric motor carried by chassis 322 and coupled to one or more of the wheels, for example by a chain drive, a belt drive, a shaft drive, and/or any combination of the foregoing.

Steering mechanism 356 of vehicle 300 may be driven by one or more motors or steering actuators 101, which may optionally be controlled by the controller for steering the vehicle. In some embodiments, one or more steering actuators 101 may be carried by chassis 322 for causing rotation of steering shaft 359 relative to the chassis. For example, a steering actuator 101 may be provided at the top of stem 371 for pivoting and/or rotating steering shaft 359 within stem 371. In some embodiments, one or more steering actuators 101 may be provided on suspension assembly 331 for causing wheels 326, 327 to pivot about respective pivot assemblies 336 in any suitable manner. For example, one or more steering actuators 101 may be provided to move one or both of steering rods 357, 358, one or both of spindle axles 337, and/or any combination the foregoing. The foregoing motors or actuators may each be of any suitable type, for example an electric motor or actuator.

Pivot assembly 386 of wheeled vehicle 300 may be driven by one or more motors or actuators 102, which may optionally be controlled by an electronic controller, or motorized or actuated, for tilting chassis 322 relative to the surface on which the wheeled vehicle is traveling, or any line extending substantially parallel to such surface. Each of such one or more motors or actuators may be referred to as a tilting actuator 102. In some embodiments, one or more tilting actuators 102 may be carried by chassis 322 for causing the chassis to tilt relative to suspension assembly 331, and thus cause the chassis 322 to tilt relative to the surface on which vehicle 300 is traveling. For example, a tilting actuator 102 may be provided in the vicinity of pivot assembly 386, e.g., as shown in FIG. 3, carried by bottom tube 373 of chassis 322. One or more tilting actuators 102 may be provided within pivot assembly 386, mounted on suspension assembly 331, mounted on stem 371, mounted on bottom tube 373, and/or any combination the foregoing. The foregoing motors or actuators may be of any suitable type, for example an electric motor or actuator.

Any or all of wheels 326, 327, 328 of wheeled vehicle 300 may be slowed and/or stopped by a braking mechanism of any suitable type (not shown), for example any suitable known braking mechanism utilized on automobiles, trucks, motorcycles and/or other vehicles suitable for traveling on transportation networks of any type. In some embodiments, each of the wheels 326, 327, 328 has a separate braking mechanism for slowing or stopping the respective wheel. Each of the braking mechanisms of wheeled vehicle 300 may be optionally controlled by a motor or actuator 106, which may optionally be controlled by the controller for slowing, braking, and/or stopping the respective wheel of vehicle 300. Each of such motors or actuators may be referred to as a braking actuator 106. In some embodiments, a separate braking actuator 106 is carried by chassis 322 in the vicinity of one or all of wheel rotation assemblies 346 of vehicle 300. In some embodiments, a braking actuator 106 is carried by chassis 322 in the vicinity of each wheel rotation assembly 346 for slowing and/or stopping the respective wheel 326, 327, 328 of vehicle 300. A braking actuator 106 for a wheel may be carried within the wheel. In some embodiments, a brake actuation mechanism (not shown) may be provided for each wheel 326, 327, 328, and may include a brake rotor rigidly affixed to the rotating wheel, a brake caliper rigidly affixed to the respective wheel rotation assembly and/or other wheel mounting point, and a mechanism for applying force on the caliper to provide braking friction on the brake rotor and thus on the wheel. In some embodiments, the brake actuation mechanism may include a hydraulic mechanism in lieu of a braking actuator 106, as part of a braking actuator 106, and/or in addition to a braking actuator 106. In some embodiments, the brake mechanism may be independently actuated by a human operator and/or the electronic controller, including processing logic provided on vehicle 300, such that either the human or the controller may fully stop the vehicle.

Other suitable suspension assemblies may be provided for coupling the wheels of vehicle 300, for example first and second wheels 326, 327, to chassis 322. For example, a suspension assembly may be provided for causing the wheels coupled thereto to pivot and/or tilt, for example about an axis substantially parallel to and/or along the direction of travel of vehicle 300, during turning of the wheels. In some embodiments, the wheels may tilt substantially in unison with the tilting of chassis 322 of vehicle 300, for example during turning.

Figure 4:
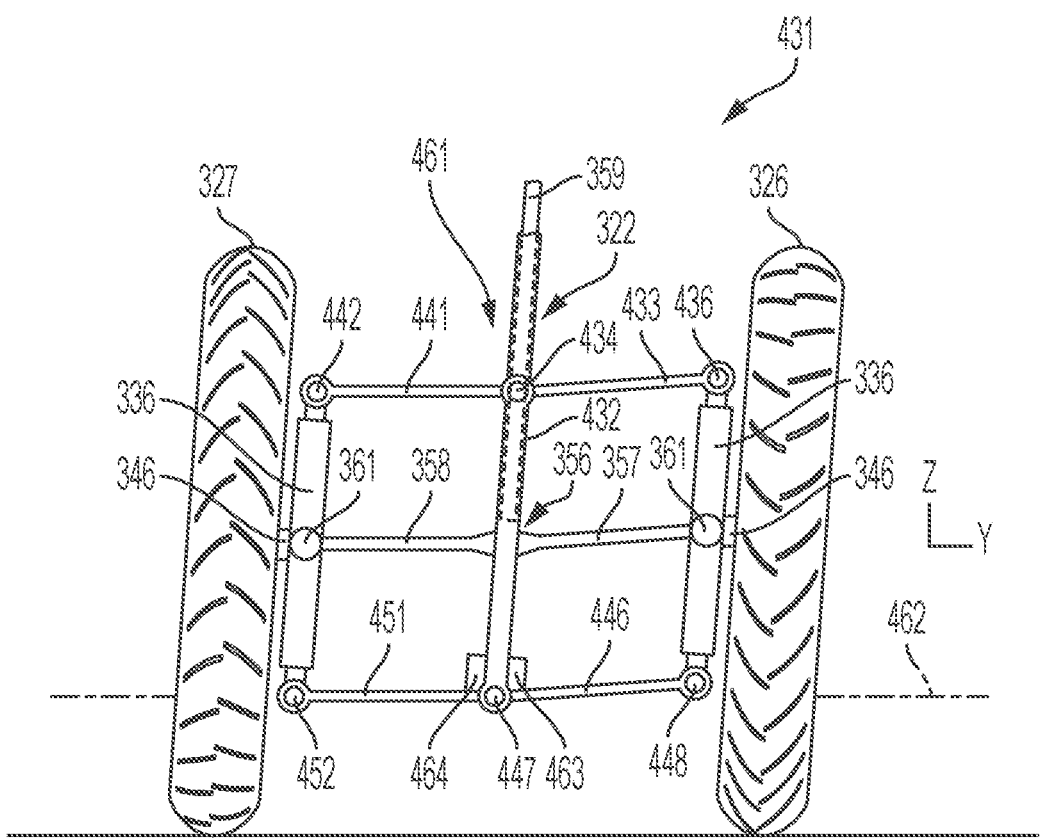
FIG. 4 is a schematic front view of an illustrative vehicle wheel assembly suitable for use in a vehicle of the present teachings.

One suitable suspension assembly 431 is illustrated in FIG. 4, where like reference numbers have been used to describe like components of suspension assemblies 331 and 431. In some embodiments, each of first and second wheels 326, 327 is rotatably coupled, for example by a suitable wheel rotation assembly 346, to a suitable pivot assembly, for example pivot assembly 336. For example, in the manner discussed above, each pivot assembly 346 permits the respective wheel 326, 327 to pivot and/or turn relative to suspension assembly 431 and thus to vehicle 300.

Suspension assembly 431 may include a central element 432 that may be rigidly coupled and/or otherwise secured to chassis 322 so as to tilt in unison with chassis 322 during turning and/or certain other operations of vehicle 300. In some embodiments, pivot assemblies 336 extend substantially parallel to each other, and to central element 432, during turning and/or certain other operations of vehicle 300. Suspension assembly 431 may include a pair of upper suspension arms for coupling the top of each pivot assembly 336 to the top of central element 432, and a pair of lower suspension arms for coupling the bottom of each pivot assembly to the bottom of central element 432. For example, an upper first suspension arm 433 may be provided and have an inner end pivotably coupled to the top of central element 432, for example at pivot element or pin 434, and an outer end pivotably coupled to the top of first pivot assembly 336, for example at pivot element or pin 436. An upper second suspension arm 441 may be provided and have an inner end pivotably coupled to the top of central element 432, for example at pivot element 434, and an outer end pivotably coupled to the top of second pivot assembly 336, for example at pivot element or pin 442. A lower first suspension arm 446 may be provided and have an inner end pivotably coupled to the bottom of central element 432, for example at pivot element or pin 447, and an outer end pivotably coupled to the bottom of first pivot assembly 336, for example at pivot element or pin 448. A lower second suspension arm 451 may be provided and have an inner end pivotably coupled to the bottom of central element 432, for example at pivot element 447, and an outer end pivotably coupled to the bottom of second pivot assembly 336, for example at pivot element or pin 452. In some embodiments, each set of upper and lower suspension arms extend parallel to each other. For example, upper first suspension arm 433 may extend parallel to lower first suspension arm 446, and upper second suspension arm 441 may extend parallel to lower second suspension arm 451. In this regard, for example, central element 432 may have a length approximately equal to the length of either pivot assembly 336.

The pivotable coupling of each suspension arm to central element 432 and its respective pivot assembly 336 causes each pivot assembly to passively tilt substantially in unison with central element 432, and thus with chassis 322. Such pivotable coupling of each suspension arm to central element 432 and its respective pivot assembly may additionally permit relative upward and downward movement between central element 432 and the respective pivot assembly, for example to accommodate bumps or obstacles encountered by the respective wheel during operation of vehicle 300.

Any suitable steering mechanism or assembly 356 may be provided for causing each of first and second wheels 326, 327 to pivot about the respective end of the suspension assembly 431 so as to permit steering of the vehicle 300. In some embodiments, a steering mechanism or assembly 356 includes first and second steering rods 357, 358, which may be coupled in any suitable manner to steering shaft 359 so that rotation of steering shaft 359 causes steering rods 357, 358 to move laterally relative to the steering shaft, causing wheels 326, 327 to pivot substantially in unison about the pivot axis of the respective pivot assembly 336. In some embodiments, each of the steering rods 357, 358 has an outer end pivotably coupled in any suitable manner to the respective pivot assembly 336, for example to an arm 361 extending perpendicularly from the pivot assembly, for causing such pivoting and/or steering of the respective wheel 326, 327.

Chassis 322 of the vehicle 300 may be pivotably coupled to suspension assembly 431 by any suitable pivot assembly 461, for example a pivot assembly that includes pivot elements 434, 447 for permitting chassis 322 to tilt relative to suspension assembly 431. Pivot assembly 461 may be driven by one or more motors or actuators 102, which may optionally be controlled by the computer network of the present disclosure, or motorized or actuated, for tilting chassis 322 relative to the surface on which the wheeled vehicle is traveling and/or to any reference line or plane 462 extending substantially parallel to such a surface. Each of the one or more motors or actuators may be referred to as a tilting actuator 102. In some embodiments, one or more tilting actuators 102 may be carried by chassis 322 for causing the chassis to tilt relative to suspension assembly 431, and thus cause the chassis to tilt relative to the surface on which the vehicle 300 is traveling, and/or to reference line 462. For example, a tilting actuator may be provided in the vicinity of one or both of pivot elements 434, 447. For example, as shown in FIG. 4, a first tilting actuator 463 may be carried by central element 432, suspension 446, or both, for causing relative pivotal movement between central element 432 and suspension arm 446 about pivot element 447. Such relative pivotal movement between central element 432 and suspension arm 446 may passively cause relative pivotal movement between central element 432 and suspension arm 433 about pivot element 434. Similarly, a second tilting actuator 464 may be carried by central element 432, suspension 451, or both, for causing relative pivotal movement between central element 432 and suspension arm 451 about pivot element 447. Such relative pivotal movement between central element 432 and suspension arm 451 may passively cause relative pivotal movement between central element 432 and suspension arm 441 about pivot element 434.

In operation and use of vehicle 300, the one or more tilt actuators 102 may cause chassis 322 to tilt relative to the surface on which the vehicle is traveling, or relative to a plane or line, such as reference line 462 extending substantially parallel to the travel surface. The degree of such tilt may be controlled in any suitable manner, for example, by the computer network of the present disclosure, including vehicle controller 111 (see FIG. 5). For example, during the turning of vehicle 300, while lateral accelerations and/or centrifugal forces are exerted on chassis 322, vehicle controller 111 and/or other aspects of the computer network of the present disclosure may direct the one or more tilt actuators 102 to pivot and/or tilt chassis 322 so as to compensate in whole or in part for such lateral accelerations and/or centrifugal forces. The computer network, for example vehicle controller 111, may receive input from one or more sensors, for example one or more of sensors 121 (see FIG. 5), to measure such accelerations, centrifugal forces and/or other characteristics of chassis 322 so as to determine the degree, amount, and/or angle to which chassis 322 should be pivoted and/or tilted by the one or more tilt actuators 102. For example, an IMU sensor, which may be included in the one or more sensors 121, and may optionally include a solid-state accelerometer, may be utilized for measuring any suitable acceleration and/or force in this regard. The degree, amount, and/or angle of such tilt may be sensed and/or measured by any suitable sensor, for example a sensor included in the one or more sensors 121, and directed back to controller 111 or other aspects of the computer network as feedback. Any suitable algorithm may be programmed into the computer network, either as firmware, software or both, for analyzing the input signals provided by one or more sensors and for instructing and/or controlling the one or more tilt actuators 102.

Figure 5:
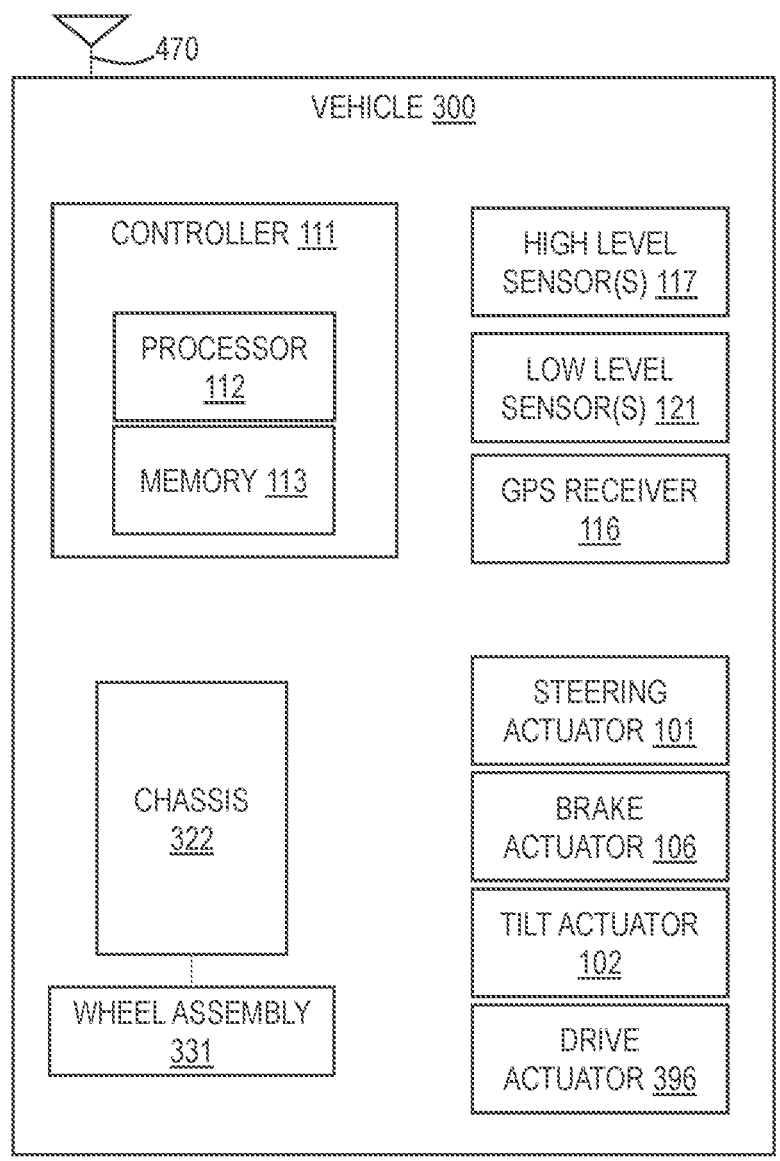
FIG. 5 is a schematic block diagram of the vehicle of FIG. 3 and selected components of a control system thereof.

Turning now to FIG. 5, a controller 111 of vehicle 300 may include processing logic of any suitable configuration located on vehicle 300. In some embodiments, controller 111, which may be referred to as a computer or computerized controller, may include a processor 112 and a storage or memory 113 of any suitable type. The processing logic of controller 111 may be electronically coupled, for example electrically, optically, wirelessly, etc., to any or all of the electrically-operated components, mechanisms, or devices of vehicle 300 so as to permit the processing logic to control such components, mechanisms, or devices. For example, the controller may be electronically coupled to any or all of the actuators of the vehicle, for example any or all of actuators 396, 101, 102 and 106. The processing logic or controller 111 may include a receiver and/or antenna 470 for receiving commands from a remote source, which may be sent by controller 111 to one or more of the actuators and/or other electronically-controlled mechanisms or devices of vehicle 300.

In some embodiments, controller 111 may optionally be provided with input signals from a global positioning system (GPS) device or receiver 116 of any suitable type. In some embodiments, controller 111 may utilize input signals from one or more sensors 117 of any suitable type, including for example one or more vision or other cameras, one or more LIDAR devices or sensors, one or more sonar devices or sensors, one or more radar devices or sensors, one or more near infrared (NIR) devices or sensors, an inertial measurement unit (IMU) device or sensor, a sensor for measuring lateral accelerations on the chassis and/or vehicle, a solid-state accelerometer, or any combination of the foregoing. Sensors 117 may be referred to as high-level sensors. Sensors 117 may be part of controller 111, part of a robot computing system, part of a perception system (e.g., a computer vision system), and/or any combination of the foregoing. In some embodiments, controller 111 may optionally include at least one transceiver and/or antenna 470 of any suitable type, which may optionally include a Long-Term Evolution (LTE) and/or other cellular transmitting and receiving device, a wireless local area networking (Wi-Fi) transmitting and receiving device, a Bluetooth® protocol transmitting and receiving device, a radio frequency (RF) transmitting and receiving device, a low-power radio frequency transmitting and receiving device, or any combination of the foregoing. Controller 111 may have fewer electronic components than described above or additional components not described above. Controller 111 may be carried anywhere on vehicle 300. Sensors 117 may be carried and/or provided anywhere on vehicle 300, for example on one or more ends of the vehicle, one or more sides of the vehicle, or any combination the foregoing.

Vehicle 300 may optionally include one or more sensors 121 for detecting physical characteristics of the vehicle, for example while the vehicle is at rest, during operation of the vehicle, or both. Sensors 121 may be referred to as low-level sensors. Sensors 121 may optionally include a suitable odometry sensor provided on or with respect to each wheel of vehicle 300, including for example on or with respect to any or all of wheels 326, 327 and 328, for sensing rotary motion of the wheels. For example, such a rotary sensor could be provided on one or more of wheel rotation assemblies 346. Sensors 121 may optionally include a suitable angular or other position sensor provided on each joint or linkage or movable member of vehicle 300, including for example pivot assembly 336, wheel rotation assembly 346, first steering rod 357, second steering rod 358, steering shaft 359, coupling bracket 362, fork 376, pivot assembly 377, pivot assembly 386, chassis 322, or any combination of the foregoing, for detecting or sensing movement or position of such member. Sensors 121 may optionally include at least one sensor coupled between vehicle chassis 322 and the suspension assembly for wheels 327, 328 for detecting the relative angle between them. Sensors 121 may optionally include at least one sensor coupled to the tilt rotational joint or pivot assembly for detecting the vehicle tilt angle. Sensors 121 may optionally include at least one sensor coupled to wheel rotation assembly 346 of any or all of wheels 326, 327, 328 for detecting the position and velocity of the rotation of the respective wheel. Sensors 121 may optionally include at least one sensor for each unactuated or passive joint in the vehicle, for example in the suspension assembly 331, for detecting the vehicle and/or chassis pose as a passive joint rotates or pivots.

Sensors 117 and 121 may optionally be electrically coupled to the controller of the present disclosure, for example controller 111, either directly or indirectly, so that the signals therefrom may be utilized by controller 111 and/or any aspect of the controller of the present disclosure in the operation of system of the present disclosure, including the operation of vehicle 300. For example, the input signals from sensors 117 may be used by processing logic of the controller of the present disclosure for navigating vehicle 300. The input signals from sensors 121 may be used for accomplishing such navigation, for example monitoring and controlling the mechanical characteristics of vehicle 300 during its use.

Vehicle 300, as so controlled by actuators such as any or all of actuators 396, 101, 102 and 106 and any other electronically controlled device, may be referred to as a fly-by-wire vehicle. Such a fly-by-wire vehicle may be controlled electronically, for example by the computer network of the present disclosure, which may include one or more computers or other processing logics which may include onboard controller 111. The operation of such a fly-by-wire vehicle may be autonomous, for example without input from a human on the vehicle or a human remote of the vehicle. In such an autonomous operation of vehicle 300, the vehicle is controlled entirely by the computer network of the present disclosure, which may include onboard controller 111. The operation of such a fly-by-wire vehicle may be semiautonomous, for example controlled partially by the computer network of the present disclosure, which may include onboard controller 111, and partially by one or more humans, who may be on the vehicle, remote to the vehicle or both.

Autonomous or semiautonomous operation of vehicle 300 may include the controller of the present disclosure directing one or more drive actuators 396 to move the vehicle in a direction or along a path of travel, for example along an X-axis, an orthogonal Y-axis or both. In some embodiments, the drive actuators 396 may selectively cause vehicle 300 to move forward or backward. One or more steering actuators 101 of the vehicle 300 may be controlled by the controller to cause turning of the vehicle and thus the path of travel of the vehicle. One or more pivot assemblies of vehicle 300, for example one or more pivot assemblies 336, may be controlled by the controller, which may direct one or more steering actuators 101 to cause pivoting of the vehicle about an axis, for example a Y-axis, during turning of the vehicle. Pivoting of the vehicle may be caused by pivoting of one or more of the wheels, for example about a pivot assembly 336. One or more braking mechanisms of vehicle 300 may be controlled by the computer network, for example by means of one or more brake actuators 106, to cause slowing of the vehicle along its direction or path of travel. One or more pivot or tilt assemblies of vehicle 300, for example one or more tilt assemblies 386, may be controlled by the computer network, for example by means of one or more tilting actuators 102, to cause pivoting or tilting of the vehicle, for example chassis 322 of the vehicle, about an axis, for example an X-axis.

In some embodiments, such a fly-by-wire vehicle 300 may be operated manually, either partially or completely, for example by a human riding on the vehicle. In some embodiments, the onboard human may manually control one or all of the electronic actuators or other electronically-controlled devices of the vehicle, for example any or all of actuators 396, 101, 102 and 106, for example by providing manual inputs to the computer network of the present disclosure, providing manual inputs to one or all of such electronic actuators or other electronically-controlled devices, manually controlling hydraulic or other non-electronic control mechanisms or devices of the vehicle, or any combination of the foregoing. For example, an onboard human may manually tilt the vehicle, for example during turning of the vehicle, by shifting his or her weight, controlling his or her pose on the vehicle, or by any other known method for tilting a two-wheeled, three-wheeled or other vehicle during turning or otherwise. For example, an onboard human may manually steer the vehicle, for example during turning of the vehicle, by manually pivoting, rotating or moving handlebars, a steering wheel or any other known mechanism for turning one or more wheels of a vehicle.

Any suitable method or process may be utilized for operating vehicle 300. One suitable method for operating vehicle 300, including both autonomous and semiautonomous aspects of operating the vehicle and human operation of the vehicle, is discussed below. See also FIGS. 35-36 and associated description.

In one optional step of the method, one or more operating mechanisms enable either autonomous or semiautonomous operation of vehicle 300, or alternatively enable partial or complete operation of the vehicle by a human carried by vehicle 300. The mechanism may operate in any suitable manner. For example, the mechanism may direct autonomous or semiautonomous operation of vehicle 300 unless directed by the onboard human to permit partial or complete human control of vehicle 300.

If autonomous or semiautonomous control of the vehicle is desired, in one optional step vehicle 300 is directed by a computer network to travel over a transportation network from a first location to a second location. In another optional step, controller 111 relays driving instructions to vehicle 300 during the course of travel from the first location to the second location. In another optional step, vehicle 300 (e.g., onboard controller 111) receives the driving instructions and sends appropriate commands to the one or more drive actuators 396 and steering actuators 101 to control the respective speed and direction of travel of the vehicle. In one optional step, onboard controller 111 receives input signals from GPS receiver 116, one or more of sensors 117, or both, for use in charting the course of travel from the first location to the second location. In another optional step, vehicle 300 receives input signals from one or more sensors 121 that may measure the lateral accelerations and/or centrifugal forces exerted on the vehicle during turns. In another optional step, vehicle 300, for example onboard controller 111, sends appropriate commands to the one or more tilt actuators 102 to pivot and/or tilt chassis 322 of the vehicle relative to the travel surface and/or appropriate reference line or plane into a turn so as to compensate for such lateral accelerations and/or centrifugal forces. In another optional step, the onboard controller 111 relays instructions to vehicle 300 to slow the vehicle. In another optional step, vehicle 300, for example onboard controller 111, receives the instructions from a computer network and sends commands to the appropriate one or more brake actuators 106, which cause such one or more actuators to slow or stop the vehicle.

If partial or complete human control of the vehicle is desired, in an optional step the onboard human relays drive instructions to vehicle 300 during the course of travel from a first location to a second location. In another optional step, vehicle 300, for example onboard controller 111, receives the driving instructions from the human and sends appropriate commands to the one or more drive actuators 396 to control the speed of the vehicle. In another optional step, the one or more steering actuators 101 are deactivated and/or overridden, for example by an operating mechanism under the direction of onboard controller 111, to permit the onboard human to manually steer the vehicle, for example by utilizing steering mechanism 356 to cause first and second wheels 326, 327 to turn. In another optional step, the one or more tilt actuators 102 are deactivated and/or overridden, for example by an operating mechanism under the direction of onboard controller 111, to permit the onboard human to manually tilt chassis 322 of vehicle 300 into a turn to compensate for lateral accelerations and/or centrifugal forces exerted on the human and/or vehicle during such turning. If vehicle 300 does not include electronic brakes but for example instead includes hydraulic brakes, the human may actuate the nonelectronic brakes of the vehicle, which causes the vehicle to slow or stop. If vehicle 300 does include electronic brakes, in an optional step the human may relay brake instructions to the vehicle. In an optional step, vehicle 300, for example onboard controller 111, receives the instructions from a computer and sends commands to the appropriate one or more brake actuators 106, which cause such one or more actuators to slow or stop the vehicle.

As may be seen, the operating mechanism permits a partial or total fly-by-wire vehicle, such as vehicle 300, to be operated solely by a human, or alternatively autonomously or semi-autonomously controlled by a controller, which may include an onboard electronic controller or computer, such as processing logic of controller 111. The vehicle may be entirely fly by wire, that is totally controlled by actuators instructed by electronic signals, or controlled both by such actuators and by actuators that are not electronically controlled, for example hydraulically controlled brake or other actuators.

Turning now to FIGS. 6-26, various examples will now be discussed with respect to optional tilt actuation mechanisms (i.e., examples of tilt actuator 102) suitable for use with tiltable wheeled vehicles of the present disclosure. Suitable mechanisms will also be discussed regarding steering actuator 101 and others.

Figure 6:
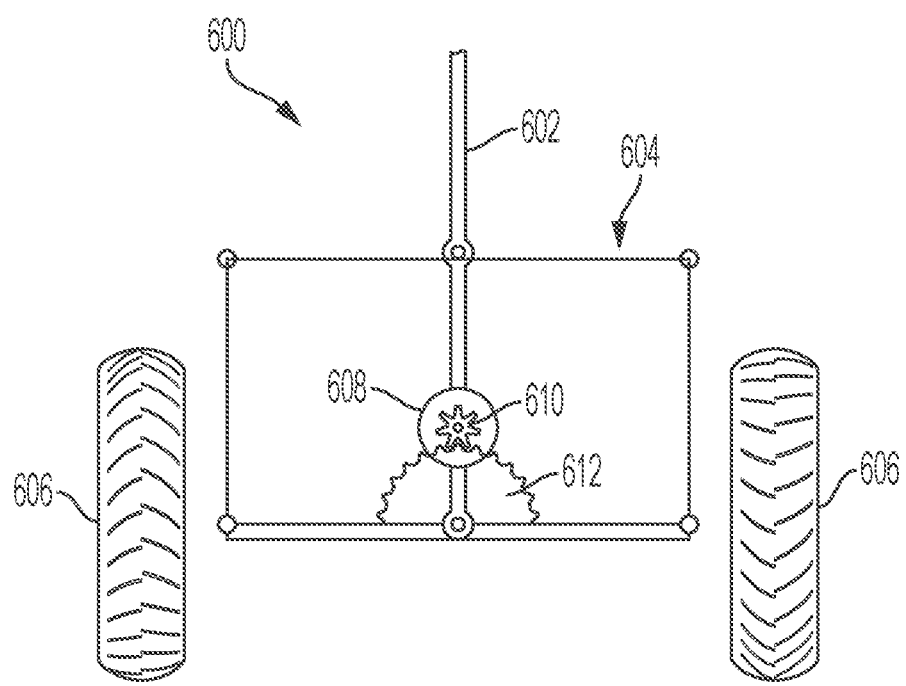
FIG. 6 is a schematic front view of a wheel assembly portion of a tiltable vehicle, in accordance with aspects of the present teachings.
Figure 7:
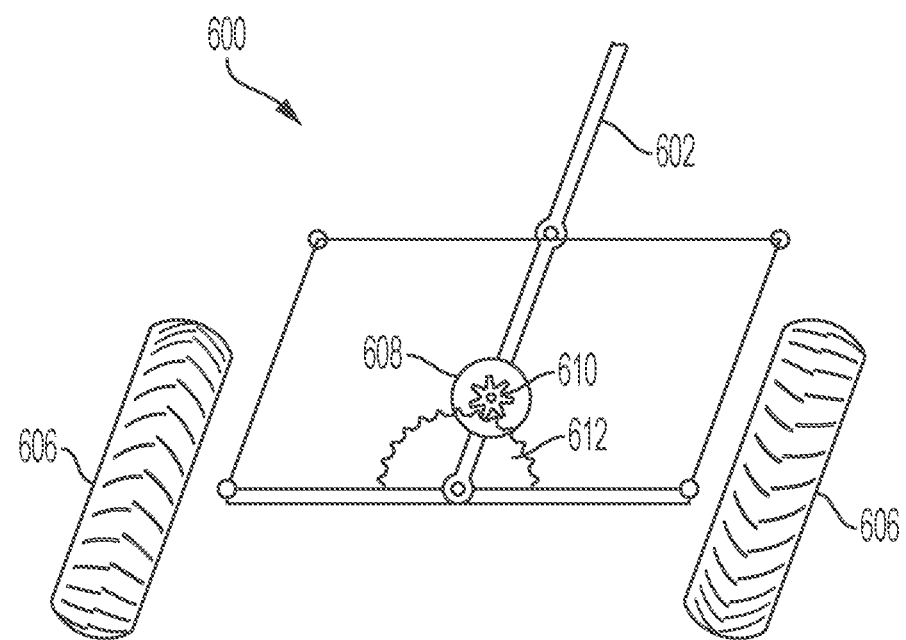
FIG. 7 is another schematic front view of the vehicle of FIG. 6, depicting the wheel assembly in a tilted position.
Figure 8:
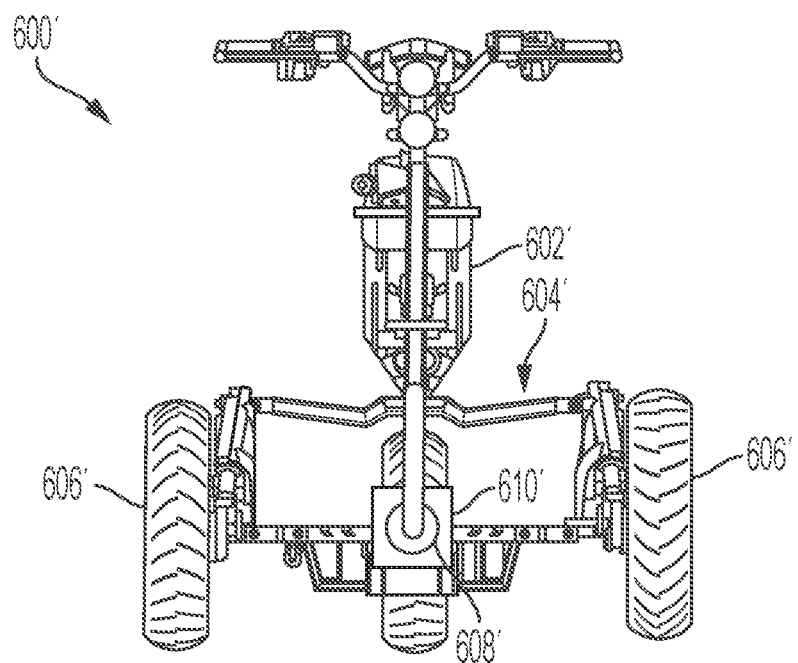
FIG. 8 is a front view of an illustrative vehicle having a wheel assembly and a selected tilt actuator, in accordance with aspects of the present teachings.

FIGS. 6-11 depict a first set of examples with respect to tilt actuator 102, wherein the tilt actuator comprises a motor coupled to a set of gears. FIGS. 6 and 7 are schematic views of a vehicle 600 having a tiltable frame or chassis 602 and four-bar wheel linkage 604 coupling the chassis to a pair of wheels 606, such that the wheels tilt in unison with the chassis. In this example, a motor 608 (e.g., a stepper motor, servo motor, or the like) is fixedly coupled to chassis 602 and controlled by a controller (e.g., controller 111). Motor 608 drives a spur gear 610, which is operatively connected with a larger gear 612 having a half-circle shape (depicted as transparent in the drawings) that is fixed to a lower bar of the linkage. The lower bar is coupled to wheels 606, which are resting on a support surface (not shown). Accordingly, as shown in FIG. 7, selective rotation of spur gear 610 by motor 608 causes chassis 602 to tilt relative to the lower bar in a controlled manner. The mechanics of the linkage also result in a corresponding tilt of wheels 606.

Figure 9:
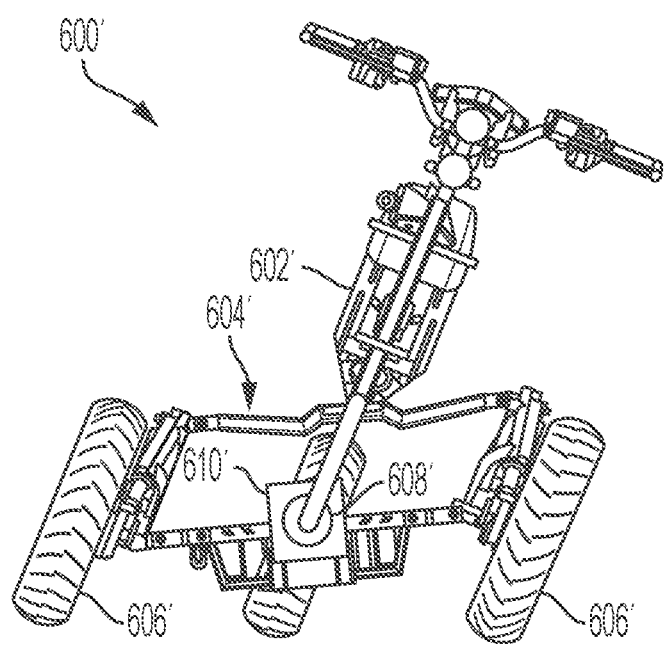
FIG. 9 is another front view of the vehicle of FIG. 8, depicting the vehicle in a tilted position.

In some examples, gears 610 and/or 612 may be packaged or configured differently, such as in a gearbox, as a planetary gear assembly, etc. In the example depicted in FIGS. 8 and 9, a vehicle 600' has a tiltable frame or chassis 602' and four-bar wheel linkage 604' coupling the chassis to a pair of wheels 606', such that the wheels tilt in unison with the chassis. In this example, a motor 608' (e.g., a stepper motor, servo motor, or the like) is coaxially mounted with a pivoting joint of chassis 602' and controlled by a controller (e.g., controller 111). Motor 608' may be coupled directly to the joint or via a gearing assembly, e.g., a gearbox 610' fixed to a lower bar of the linkage. The lower bar is coupled to wheels 606, which are resting on a support surface (not shown). Accordingly, as shown in FIG. 9, selective rotation of the motor and gear assembly causes chassis 602' to tilt relative to the lower bar in a controlled manner. The mechanics of the linkage also result in a corresponding tilt of wheels 606'.

Figure 10:
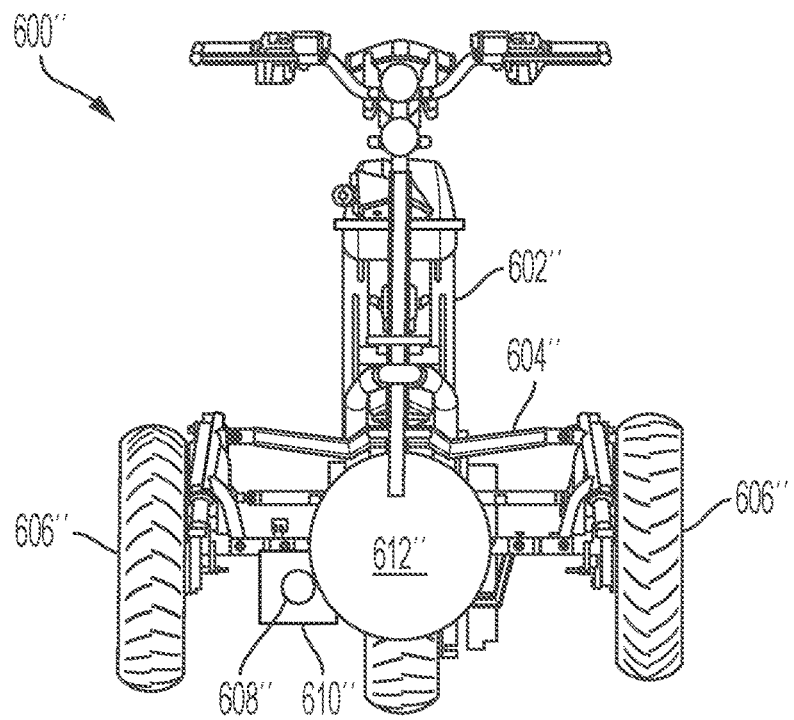
FIG. 10 is a front view of another illustrative vehicle having a wheel assembly and another selected tilt actuator, in accordance with aspects of the present teachings.
Figure 11:
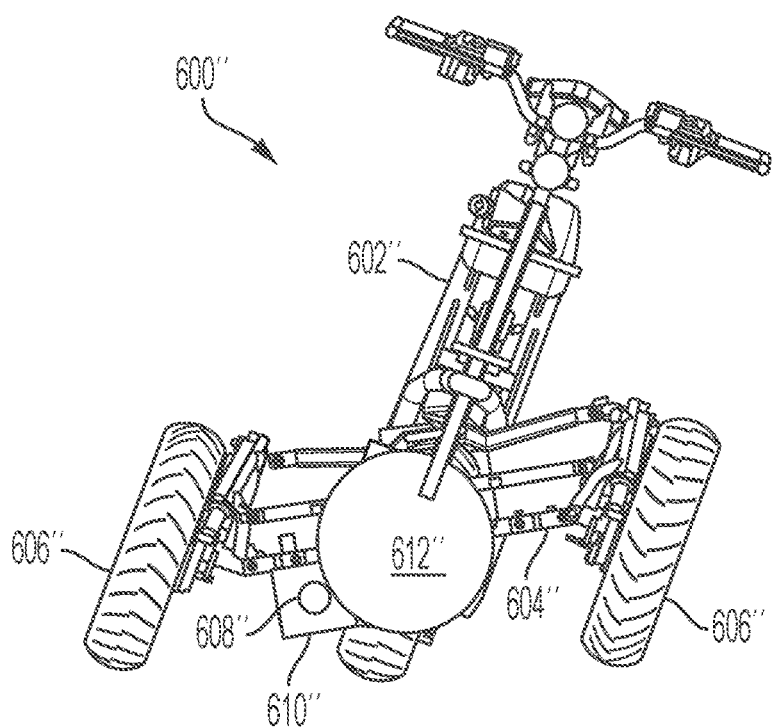
FIG. 11 is another front view of the vehicle of FIG. 10, depicting the vehicle in a tilted position.

In another example, FIGS. 10 and 11 depict a vehicle 600" having a tiltable frame or chassis 602" and four-bar wheel linkage 604" coupling the chassis to a pair of wheels 606", such that the wheels tilt in unison with the chassis. In this example, a motor 608" (e.g., a stepper motor, servo motor, or the like) is fixedly coupled to a lower bar of linkage 604" and controlled by a controller (e.g., controller 111). Motor 608" drives a spur gear 610", which is operatively coupled with a larger gear 612" affixed to chassis 602" (e.g., coaxially with a lower pivot joint between the chassis and linkage). The lower bar is coupled to wheels 606", which are resting on a support surface (not shown). Accordingly, as shown in FIG. 11, selective rotation of spur gear 610" by motor 608" causes chassis 602" to tilt relative to the lower bar in a controlled manner. The mechanics of the linkage also result in a corresponding tilt of wheels 606'''.

Figure 12:
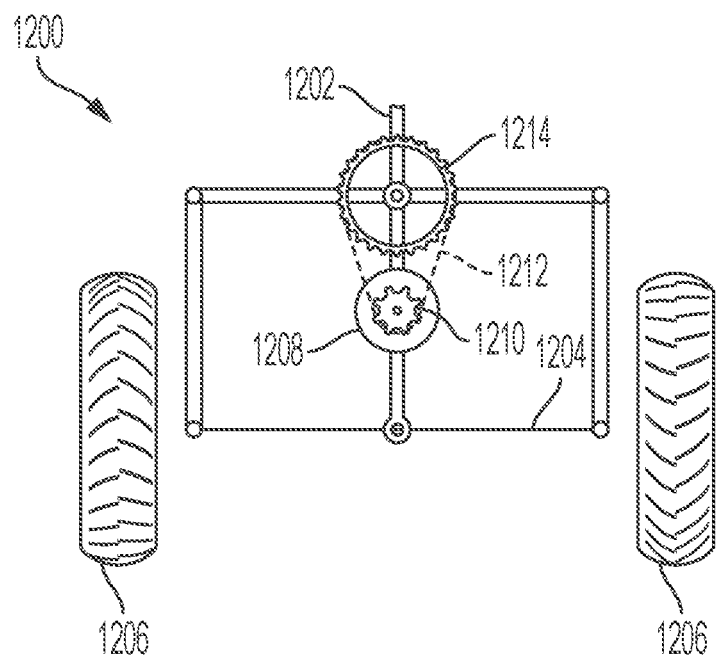
FIG. 12 is a schematic front view of yet another illustrative wheel assembly having another selected tilt actuator, in accordance with aspects of the present teachings.
Figure 13:
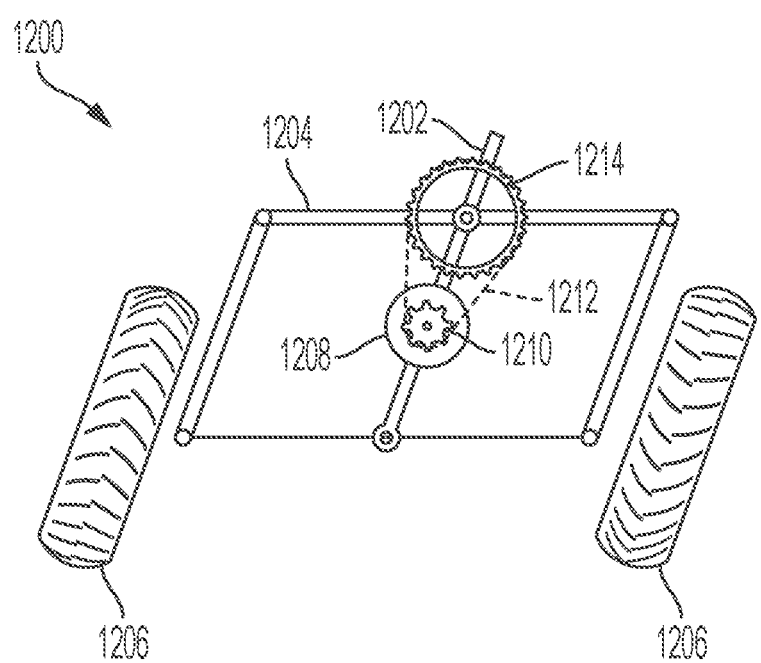
FIG. 13 is another schematic front view of the wheel assembly of FIG. 12, depicting the wheel assembly in a tilted position.

FIGS. 12-15 depict a second set of examples with respect to tilt actuator 102, wherein the tilt actuator comprises a belt or chain drive mechanism. FIGS. 12 and 13 are schematic views of a vehicle 1200 having a tiltable frame or chassis 1202 and four-bar wheel linkage 1204 coupling the chassis to a pair of wheels 1206, such that the wheels tilt in unison with the chassis. In this example, a motor 1208 (e.g., a stepper motor, servo motor, or the like) is fixedly coupled to chassis 1202 and controlled by a controller (e.g., controller 111). Motor 1208 drives a spur gear 1210, which is operatively connected by a belt or chain to a larger gear 1214 coaxially mounted to a pivoting joint between the upper bar of the linkage and the chassis. As shown in FIG. 13, selective rotation of spur gear 1210 by motor 1208 causes chain 1212 to rotate gear 1214, thereby applying rotation-inducing torque to the joint and causing chassis 1202 to tilt in a controlled manner. The mechanics of the linkage also result in a corresponding tilt of wheels 1206.

Figure 14:
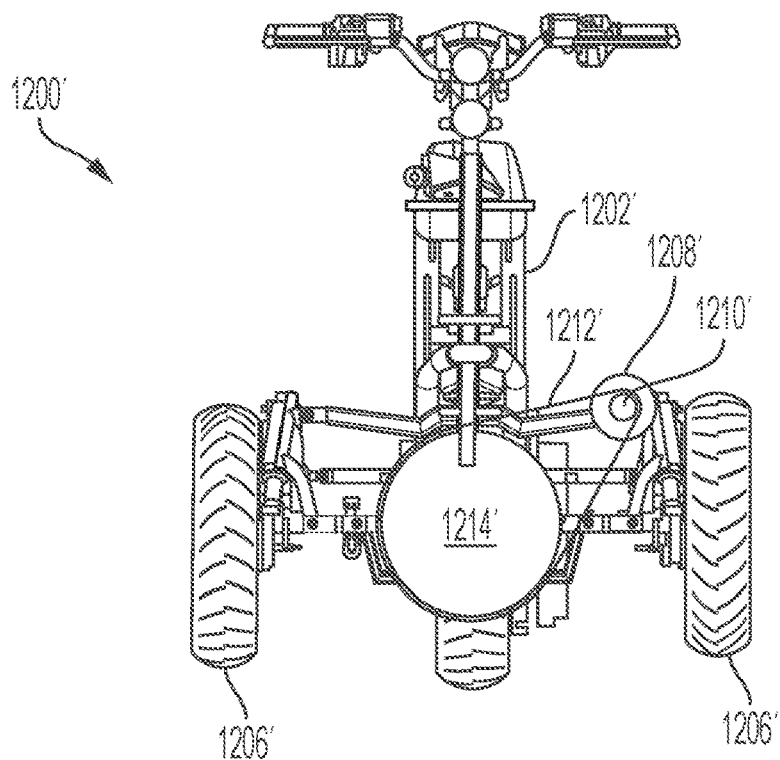
FIG. 14 is a front view of yet another illustrative vehicle having a wheel assembly and a selected tilt actuator, in accordance with aspects of the present teachings.
Figure 15:
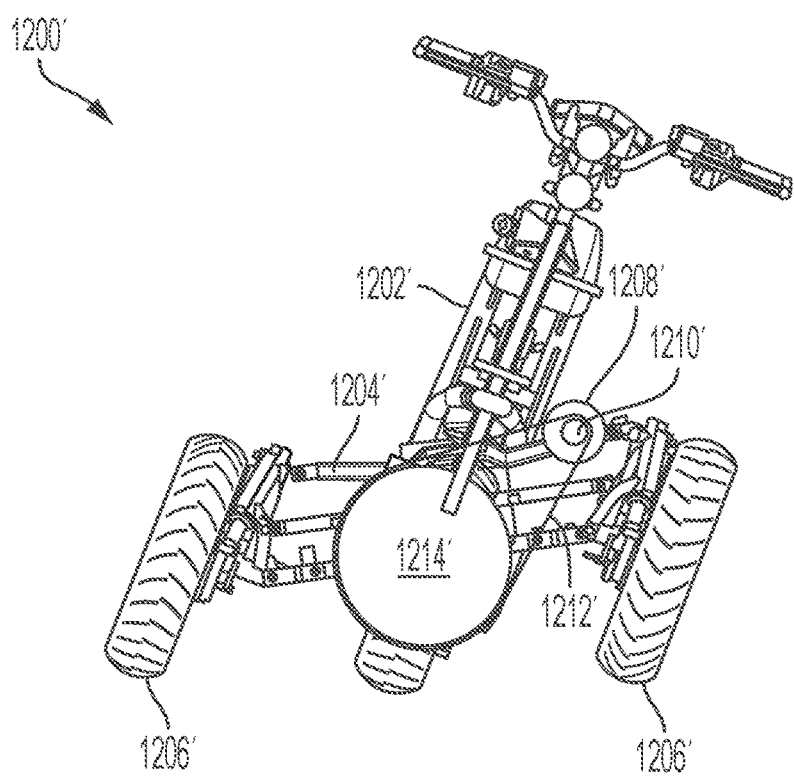
FIG. 15 is another front view of the vehicle of FIG. 14, depicting the vehicle in a tilted position.

FIGS. 14 and 15 are schematic views of a vehicle 1200' having a tiltable frame or chassis 1202' and four-bar wheel linkage 1204' coupling the chassis to a pair of wheels 1206', such that the wheels tilt in unison with the chassis. In this example, a motor 1208' (e.g., a stepper motor, servo motor, or the like) is fixedly coupled to an upper bar of the linkage and controlled by a controller (e.g., controller 111). Motor 1208' drives a spur gear 1210', which is operatively connected by a belt or chain to a larger gear 1214' coaxially mounted to a pivoting joint between the lower bar of the linkage and the chassis. As shown in FIG. 15, selective rotation of spur gear 1210' by motor 1208' causes belt/chain 1212' to rotate gear 1214', thereby applying rotation-inducing torque to the lower joint and causing chassis 1202' to tilt in a controlled manner. The mechanics of the linkage also result in a corresponding tilt of wheels 1206'.

Figure 16:
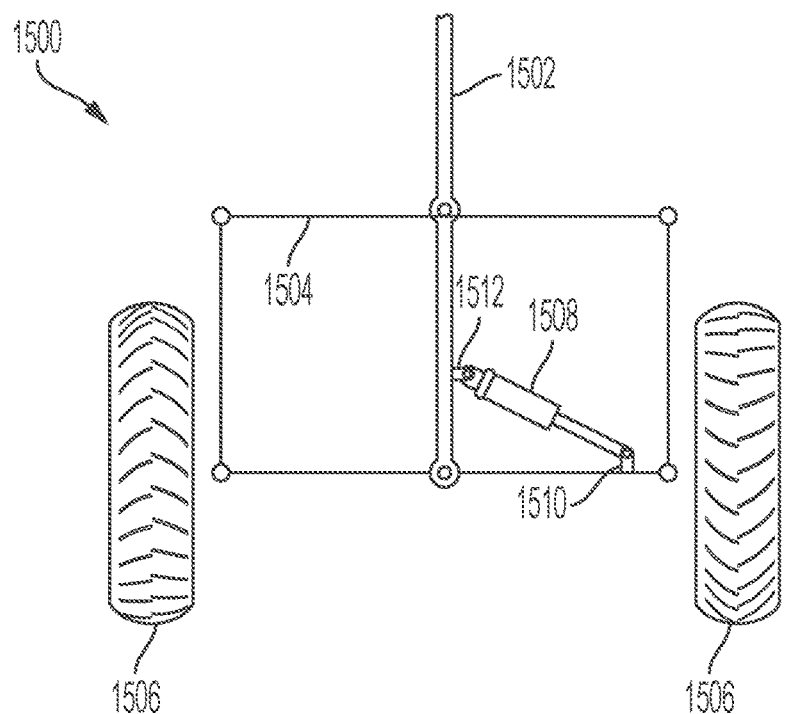
FIG. 16 is a schematic front view of yet another illustrative wheel assembly having a selected tilt actuator, in accordance with aspects of the present teachings.
Figure 17:
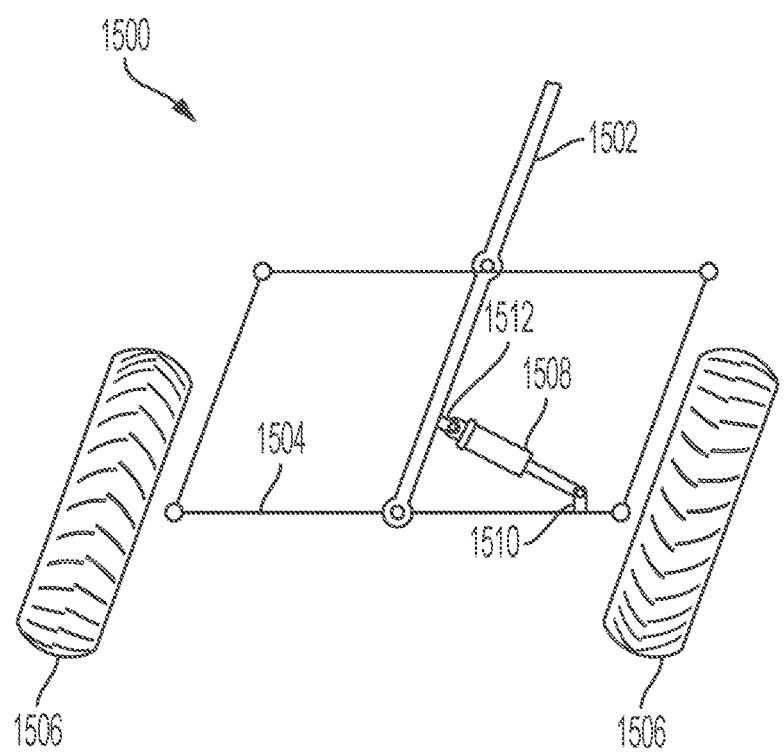
FIG. 17 is another schematic front view of the wheel assembly of FIG. 16, depicting the wheel assembly in a tilted position.

FIGS. 16-23 depict a third set of examples with respect to tilt actuator 102, wherein the tilt actuator comprises a linear actuator mechanism coupled between two articulating elements of the vehicle. FIGS. 16 and 17 are schematic views of a vehicle 1500 having a tiltable frame or chassis 1502 and four-bar wheel linkage 1504 coupling the chassis to a pair of wheels 1506, such that the wheels tilt in unison with the chassis. In this example, a linear actuator 1508 (e.g., a piston, a rack and pinion, a worm screw, or the like, actuated electrically, hydraulically, or by any other suitable method) is coupled between chassis 1502 and a (e.g., lower) bar of the linkage, and controlled by a controller (e.g., controller 111). As depicted, linear actuator 1508 is coupled at a first end by a pivoting joint 1510 to linkage 1504 and at a second end by a pivoting joint 1512 to chassis 1502. As shown in FIG. 17, selective linear actuation of linear actuator 1508 causes chassis 1502 to be urged toward or away from the lower bar of the linkage, to tilt in a controlled manner. The mechanics of the linkage also result in a corresponding tilt of wheels 1506.

Figure 18:
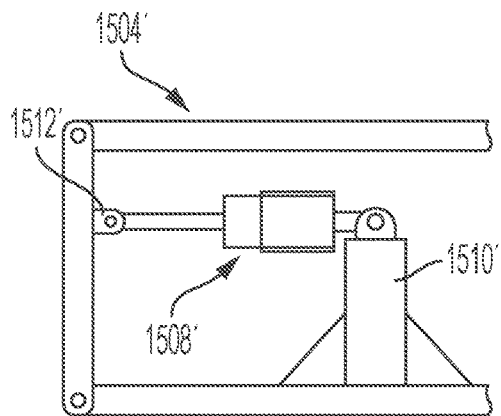
FIG. 18 is a front view of an illustrative linkage component suitable for use in a vehicle wheel assembly, in a first position.
Figure 19:
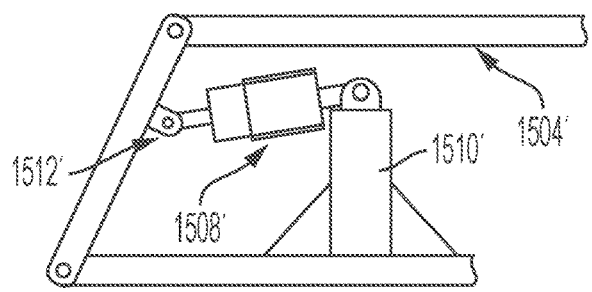
FIG. 19 is another front view of the linkage component of FIG. 18, depicting the linkage component in a second position.
Figure 20:
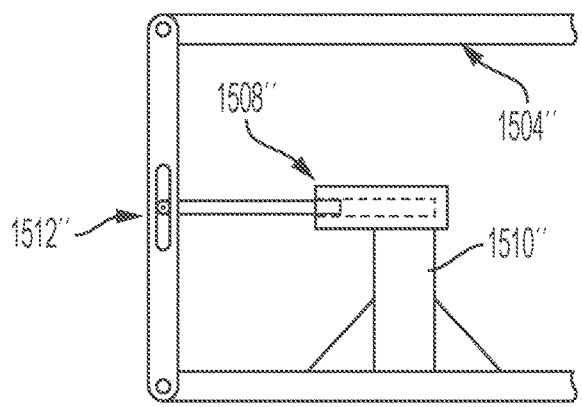
FIG. 20 is a front view of another illustrative linkage component suitable for use in a vehicle wheel assembly, in a first position.
Figure 21:
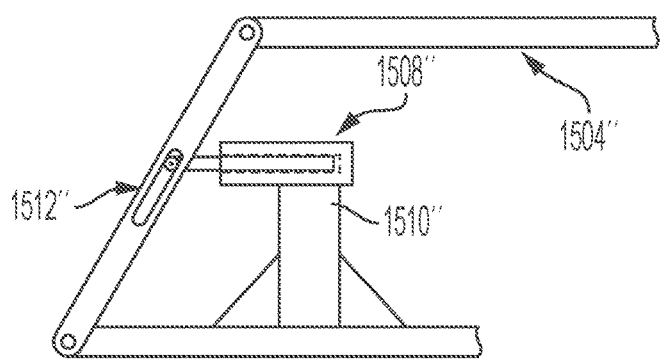
FIG. 21 is another front view of the linkage component of FIG. 20, depicting the linkage component in a second position.

FIGS. 18-23 depict further examples where tilt actuator 102 comprises a linear actuator. In these examples, one end of the linear actuator is fixed while the other end is a pivoting or a pivoting and sliding joint. More specifically, FIGS. 18 and 19 depict a linear actuator 1508' fixed at a first end 1510' to linkage 1504' and in a pivotable fashion at a second end 1512' to a side bar of the linkage. FIGS. 20-21 depict a similar linear actuator 1508'' fixedly coupled at a first end 1510'' to a lower bar of linkage 1504'' and slidingly coupled at a pivotable second end 1512'' to a side bar of the linkage.

Figure 22:
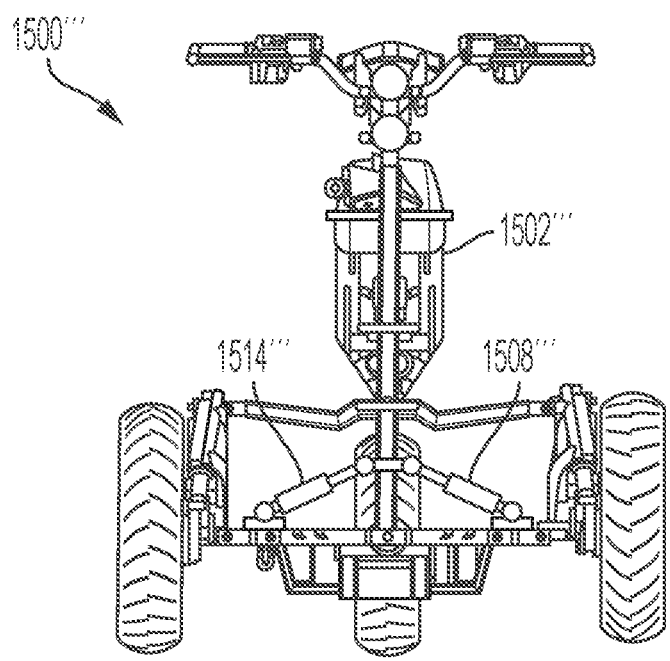
FIG. 22 is a front view of an illustrative tiltable vehicle having illustrative wheel assembly linkage components, in accordance with aspects of the present teachings.
Figure 23:
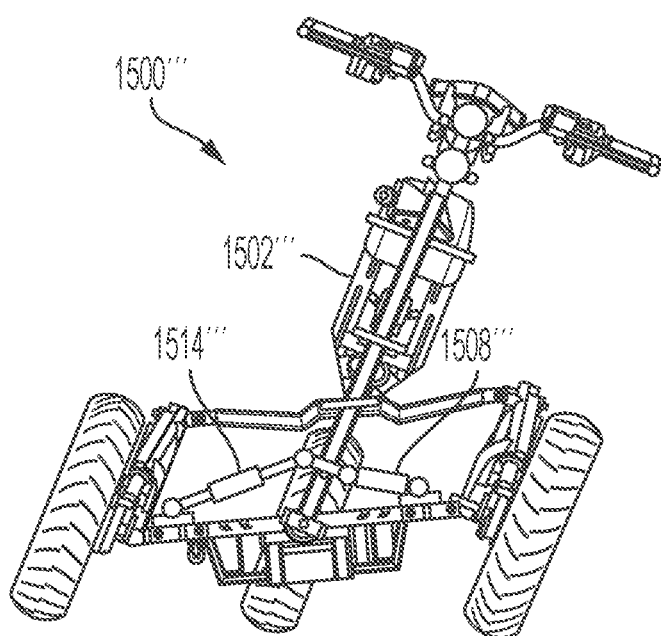
FIG. 23 is another front view of the vehicle of FIG. 22, depicting the vehicle in a tilted position.

FIGS. 22-23 depict another example where multiple (here, two) linear actuators may be utilized in tandem. Specifically, a vehicle 1500''' includes a tiltable chassis 1502''' that may be urged side to side by a pair of opposing linear actuators 1508''' and 1514''', each of which is coupled between a lower bar of the linkage and the central chassis.

Figure 24A:
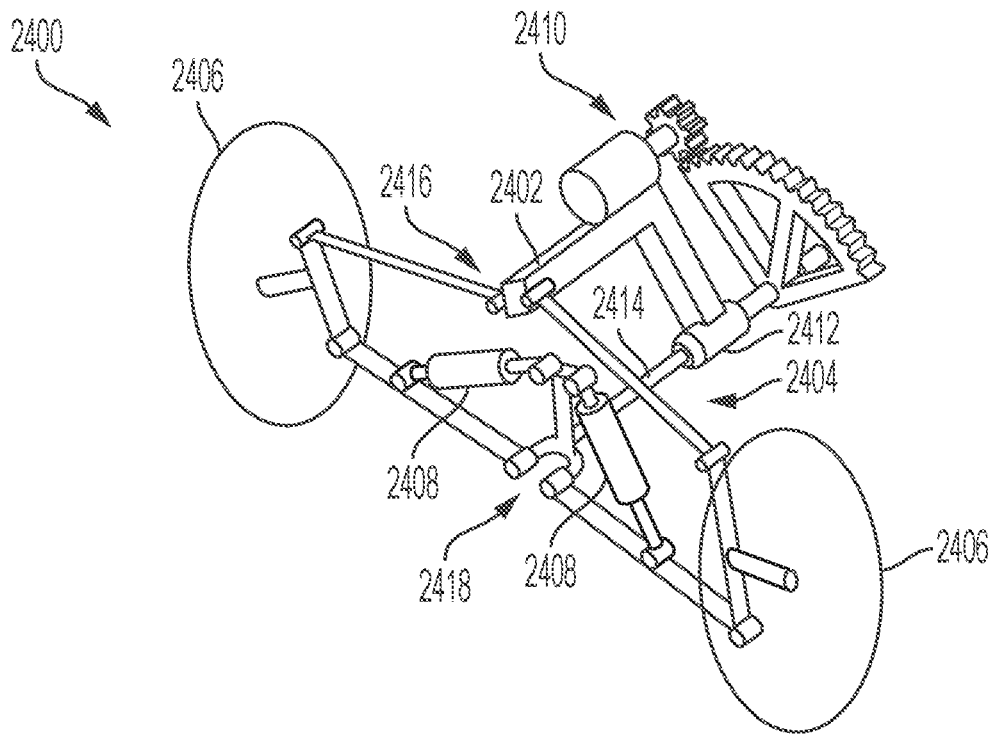
FIG. 24A is a partial, isometric, schematic view of another illustrative tiltable vehicle having an A-frame linkage, with a frame tilted in a first direction in accordance with aspects of the present teachings.
Figure 24B:
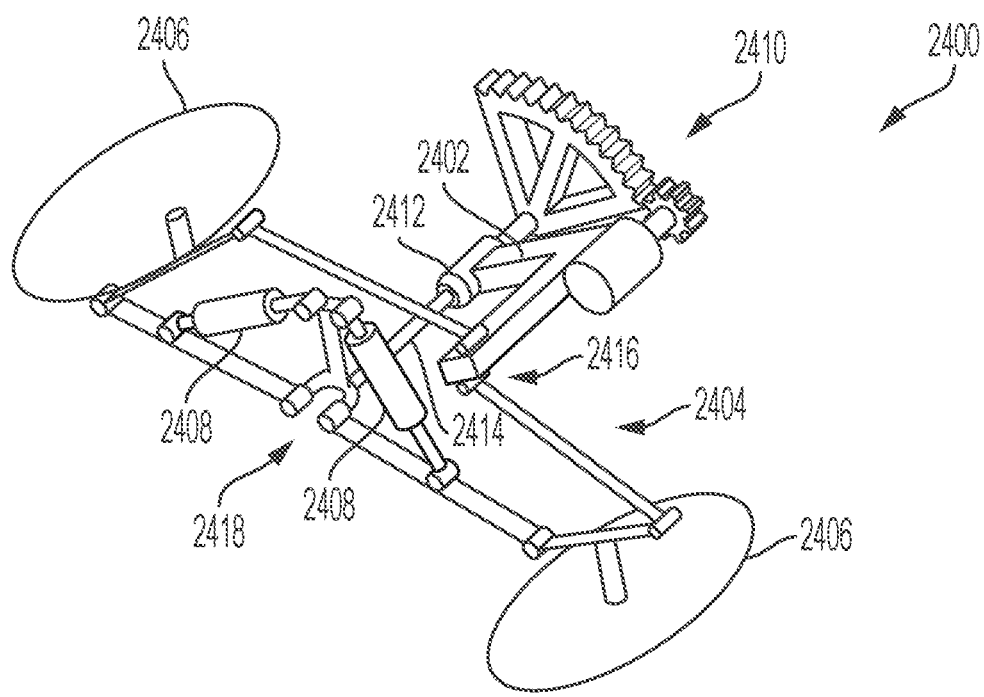
FIG. 24B is a partial, isometric, schematic view of the vehicle of FIG. 24A, tilted in a second direction.

FIGS. 24A and 24B depict yet another example of a wheeled vehicle 2400, in this case having a chassis comprising a tiltable frame 2402 pivotable with respect to a stationary (i.e., non-rotating) frame 2414 at a pivot joint 2412. Vehicle 2400 further comprises a four-bar linkage 2404 coupling the chassis to a pair of wheels 2406 configured to tilt in unison with frame 2402. Here, each lateral half of the four-bar linkage is rotatably linked to the chassis at an upper joint 2416 and at a lower joint 2418, and damped by an A-frame shock absorption system comprising a stationary central riser and a pair of springs or shock absorbers 2408 (one on either side of the riser) connected between the riser and the lower bars of the linkage. The riser is a vertical extension of stationary frame 2414. In this example, an actuator 2410 (here shown as a motor and spur gear assembly, but any suitable actuator may be utilized) is coupled between tiltable frame 2402 and stationary frame 2414, and configured to cause relative motion between the two (e.g., by applying a tilt-inducing force to frame 2402). A linear actuator, belt/chain drive, or the like may also be used. In this example, selective rotation of the spur gear by the motor transfers rotational force to the larger gear, and causes tiltable frame 2402 to tilt relative to stationary frame 2414 in a controlled manner. As depicted in FIGS. 24A and 24B, the mechanics of the linkage result in a corresponding tilt of wheels 2406.

Figure 25:
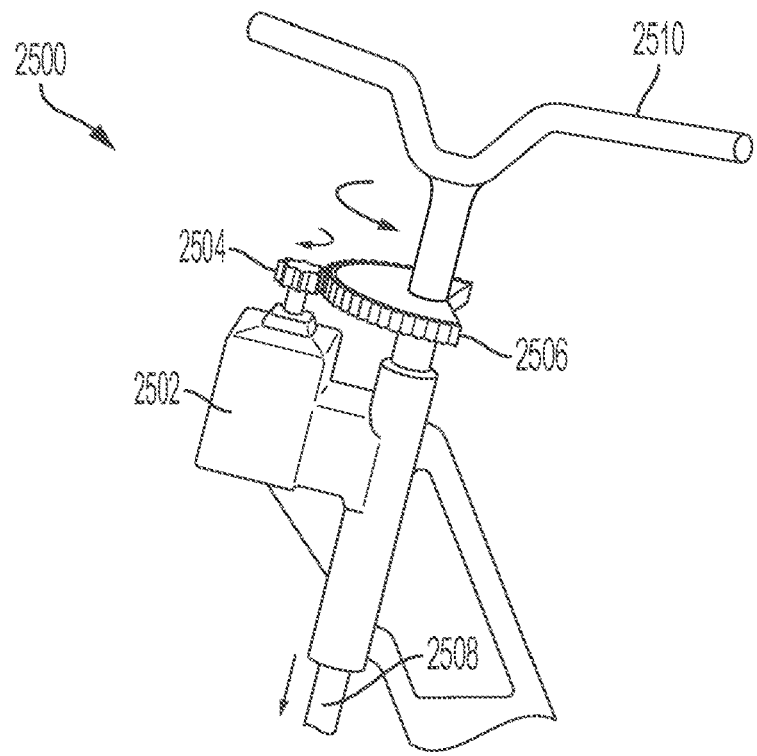
FIG. 25 is an isometric view of an illustrative vehicle steering assembly suitable for use in vehicles of the present teachings.

FIG. 25 depicts an example of steering actuator 101. In this example, a wheeled vehicle 2500 includes a servo motor 2502 controlled by a controller to selectively rotate a first gear 2504 coupled to a second gear 2506 that is mounted coaxially with respect to a steering member 2508. Steering member may accordingly be rotated automatically by motor 2502 via gears 2504 and 2506, or manually using a handlebar 2510. Steering may also be controlled using any other suitable version of actuator described herein, e.g., coupled to the steering linkage or tie rod.

The throttle and/or braking systems may also be controlled autonomously or semi-autonomously, e.g., using software to control appropriate actuators.

Figure 26:
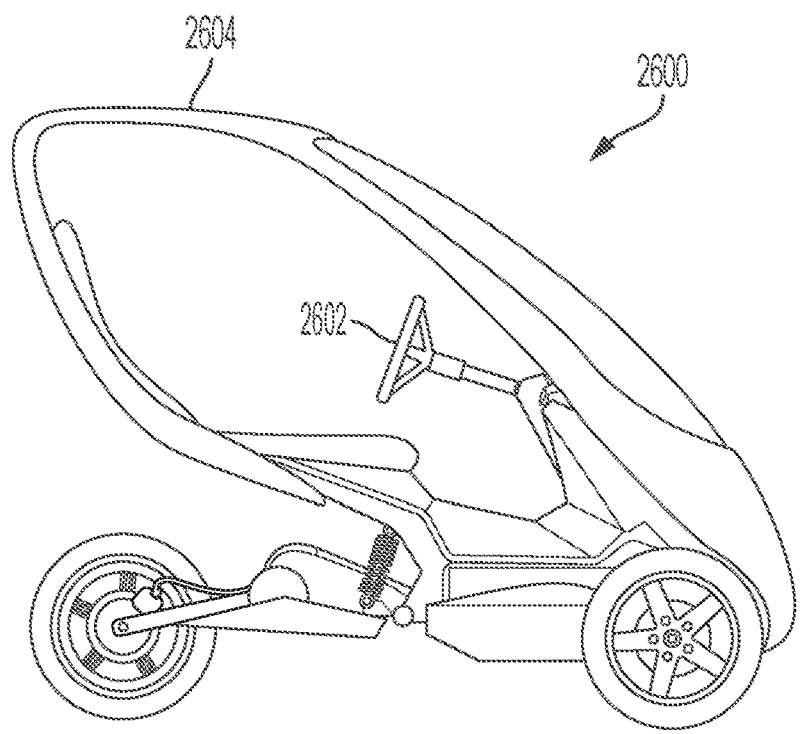
FIG. 26 is a side view of yet another illustrative tiltable vehicle, in accordance with aspects of the present teachings.
Figure 27:
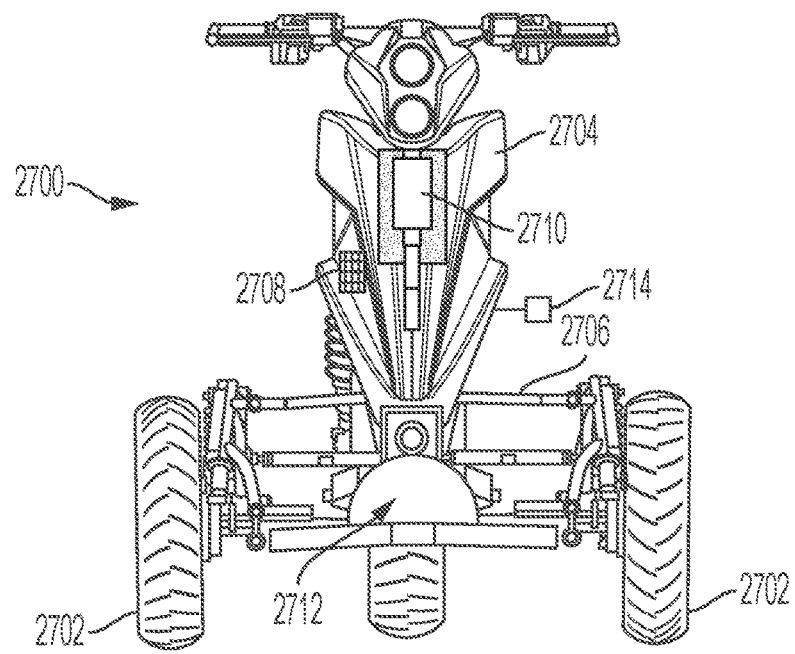
FIG. 27 is a front view of yet another illustrative tiltable vehicle, in a neutral position.

FIG. 26 depicts another example of a tiltable vehicle 2600, substantially as described above, but with a steering wheel 2602 and a canopy or windshield enclosure 2604. Steering wheel 2602 may be mechanically coupled to the wheel linkage of the vehicle, and/or may be in (e.g., wireless) communication with a controller of the vehicle to command a steering actuator.

Various aspects of the actuators described herein may be replaced with or supplemented by series elastic actuators (SEAs), which include an elastic element in series between the force-producing portion of the system and the thing being actuated. This elastic element may allow the force production to continue without incident even if the thing being actuated is impeded or opposed by an outside object or force. An SEA may improve ride feel, increase safety, and/or prevent damage to structures or motors in high stress situations such as when hitting potholes.

B. Illustrative Control Methods

This section describes steps of illustrative methods for controlling a tiltable vehicle; see FIGS. 27-37. Aspects of vehicles described above may be utilized in the method steps described below. Where appropriate, reference may be made to components and systems that may be used in carrying out each step. These references are for illustration, and are not intended to limit the possible ways of carrying out any particular step of the method.

Generally speaking, a desired tilt angle for the vehicle in question is derived by determining what side-to-side lean or tilt angle results in a net force vector aligned with the central vertical plane of the chassis, also referred to as the median plane, i.e., a plane through the vertical centerline of the vehicle dividing or bisecting the chassis into left and right portions (XZ when the chassis is vertical). The net force vector is defined as the combined force vector resulting from downward gravity and lateral centrifugal force. A sensor (e.g., an accelerometer) on the vehicle detects lateral deflection of the force vector on the chassis (e.g., due to centrifugal forces from initiating a steered turn, or lateral forces from uneven terrain during a turn or during normal operation). In response, a tilting actuator and in some cases a steering actuator are adjusted to return the net force vector to substantial alignment with the median plane of the chassis. Lean angle changes with speed and tightness of turn radius. Given the desired or optimum tilt angle for a given turn radius and/or speed, (i.e., the angle that keeps the net force vector in alignment with the chassis) the tilt linkage may be altered to maintain that tilt angle, and also to keep the tilt angle regardless of uneven/changing ground surface.

Additionally or alternatively, a substantially similar system may be utilized to control a fore/aft tilt angle, i.e., maintaining a second net force vector in line with a second vertical plane cutting laterally through the chassis and dividing the chassis into front and rear portions, also referred to as the frontal plane (YZ when the chassis is vertical). For example, this second system may be utilized to maintain a desired chassis angle when traveling uphill or downhill. The discussion below describes a side-to-side tilt control system, but the same principles may be applied to a fore/aft tilt system.

Lean (AKA tilt) to steer ratios are calculated to maintain the summary force vector (with respect to centrifugal force and the force due to gravity) in alignment with the median plane of the tilting vehicle. Generally speaking, the faster the vehicle goes for any given turn radius, the more the vehicle chassis needs to lean in order to keep this summary force vector in alignment with the median plane of the tiltable chassis. Higher speed or decreased turning radius results in an increase to the desired lean angle. Given the dynamic nature of driving conditions, one or more sensors are employed to ensure desired performance.

Rider experience (or the forces on the vehicle load during transport) is generally improved by aligning the net force vector with the chassis. Even with higher net forces, if the forces are aligned with the chassis tilt then the effect is basically an increase in G forces, rather than a subjective experience of tipping or sliding. However, values may be tuned to produce different modes, e.g., a sport mode with a more aggressive, amplified responsiveness (e.g., turning tighter for a given lean angle) or over-steering/understeering to produce various handling characteristics.

The controller(s) of the vehicle tilt/steer system may include any suitable processing logic configured to carry out algorithms such as those described herein. For example, a PID (proportional integral derivative) controller may be utilized, having a control loop feedback mechanism to control tilt/steer variables based on force vector measurement. In general, the process steps described below are illustrated by accompanying FIGS. 27-34 and outlined in FIGS. 35-36. As described above, a vehicle 2700 being controlled has at least a pair of wheels 2702 or other travel surface interfaces configured to tilt with the central chassis 2704, e.g., using a four-bar linkage 2706, as well as one or more tilt sensors 2708 (e.g., accelerometers, gyroscopes, etc.), steering actuators 2710, and tilt actuators 2712 controlled by a controller 2714 (e.g., an onboard controller). The general example used here is a three-wheeled vehicle with a tilting pair of wheels in the front, a geared tilt mechanism, and an in-line servo motor for controlled steering. However, any suitable arrangement may be utilized, as described throughout this disclosure.

Three basic modes may be utilized when controlling vehicle 2700, which is an example of the vehicles described elsewhere in this disclosure. First, both the chassis tilt and the steering may be powered and actively controlled. Second, only tilt may be powered. A third mode may include powered tilting with variable levels of steering control (e.g., based on vehicle speed).

In general, a user (e.g., using a steering wheel, joystick, or other interface) or an automated or semiautomated vehicle controller determines and/or indicates a desired vehicle path. Proper lean to steer ratios are then calculated based on the given speed. Chassis tilt and/or steering are then actuated in parallel accordingly, to maintain the net force vector in line with the median plane of the chassis. Terrain adjustments are made based on feedback from the measured chassis tilt. Two suitable control schemes are described below, with respect to FIGS. 35 and 36.

B1. Lean Follows Steer (LFS)

In a first control scheme, vehicle tilt follows vehicle steering. In other words, the wheels are steered first when entering a turn, and the vehicle chassis is caused to tilt automatically in response to the centrifugal force, such that the forces balance and the net force vector due to gravity and centrifugal force remains in line with the median plane of the tilting chassis.

Figure 35:
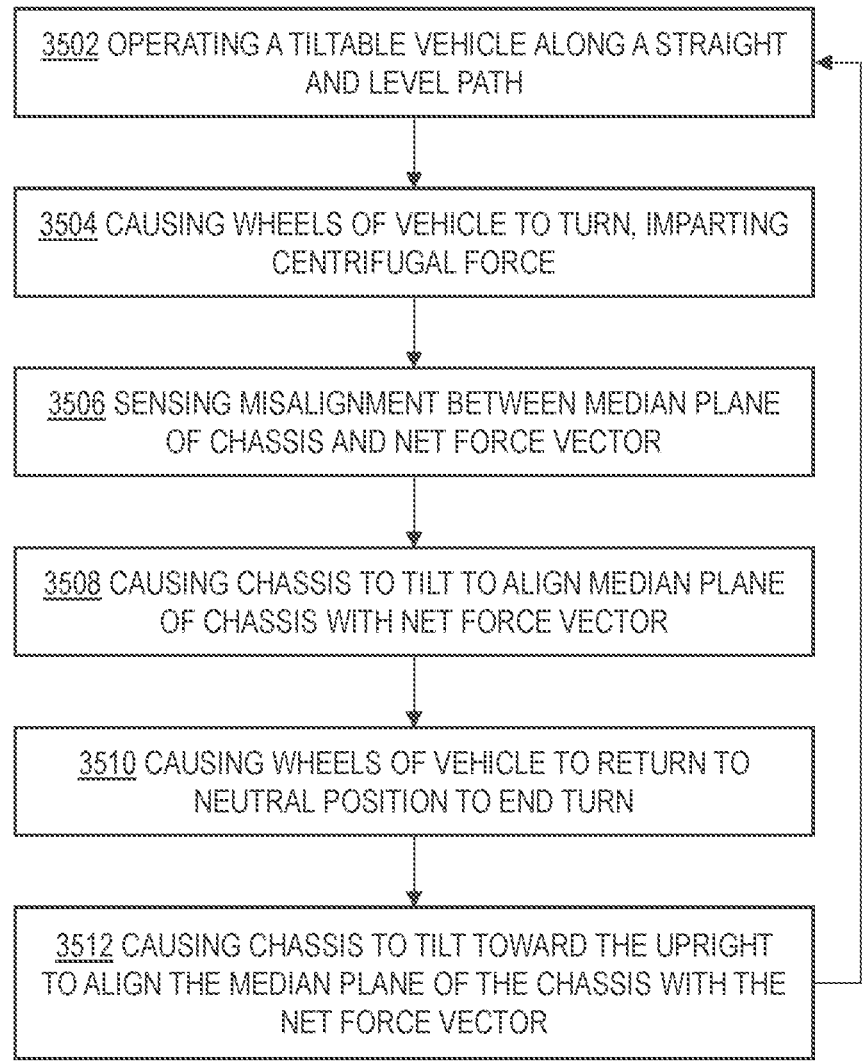
FIG. 35 is a flow chart depicting steps of an illustrative method for controlling a tiltable vehicle according to the present teachings.

FIG. 35 is a flowchart illustrating steps performed in an illustrative method 3500 implementing an LFS control scheme, and may not recite the complete process or all steps of the method. Although various steps of method 3500 are described below and depicted in FIG. 35, the steps need not necessarily all be performed, and in some cases may be performed simultaneously or in a different order than the order shown.

Step 3502 of method 3500 includes operating the vehicle (e.g., vehicle 2700) along a straight path on a level surface. In this situation, the net force vector is substantially equal to the force of gravity, and is aligned with the vertical chassis (see FIG. 27).

Figure 28:
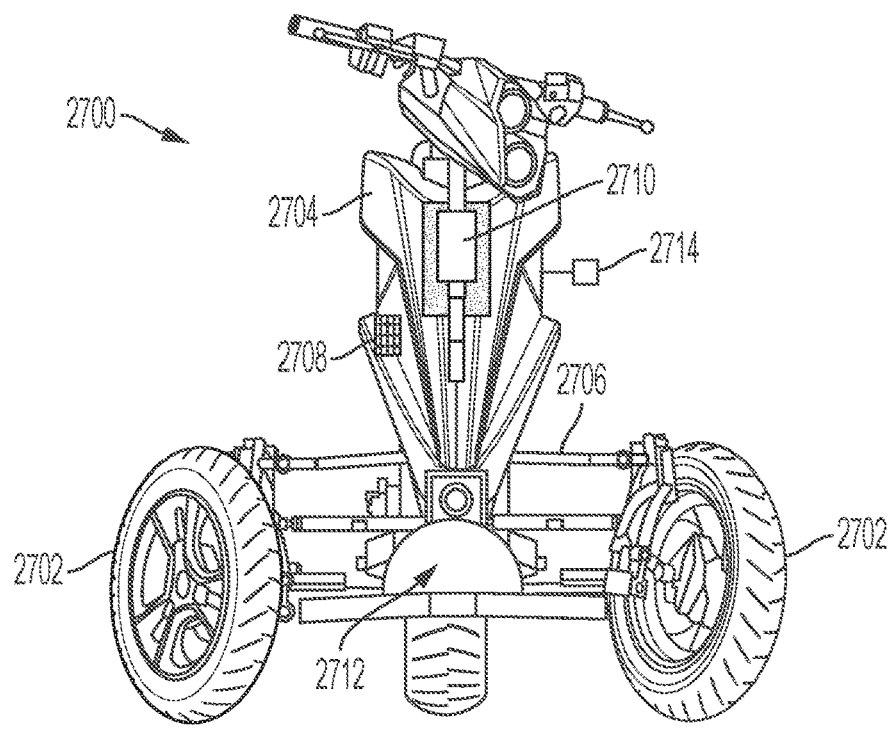
FIG. 28 is another front view of the vehicle of FIG. 27, depicting the vehicle in a turning position.
Figure 29:
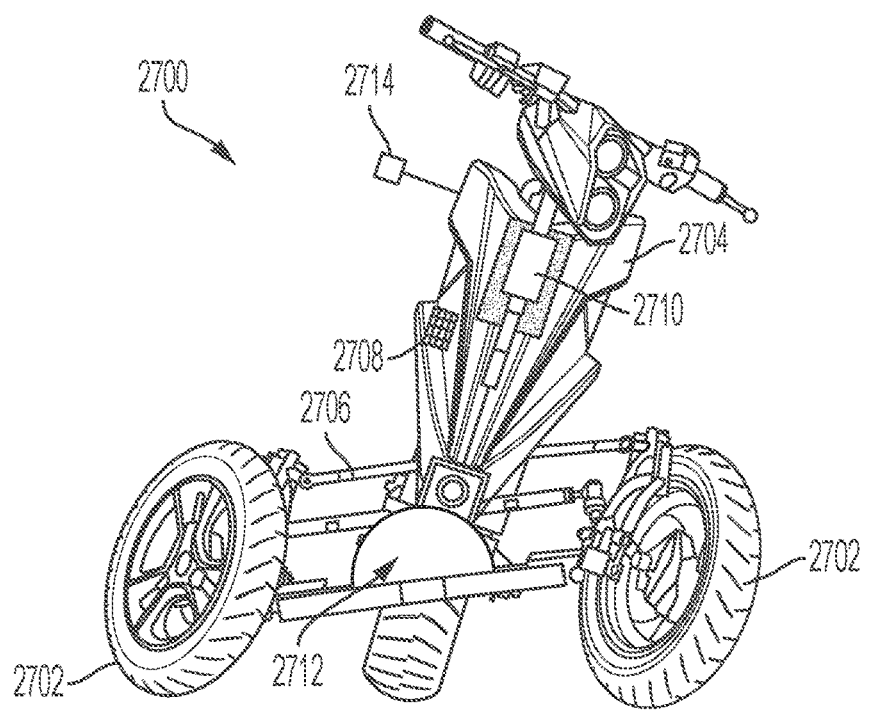
FIG. 29 is yet another front view of the vehicle of FIG. 27, depicting the vehicle in a turning and tilted position.
Figure 30:
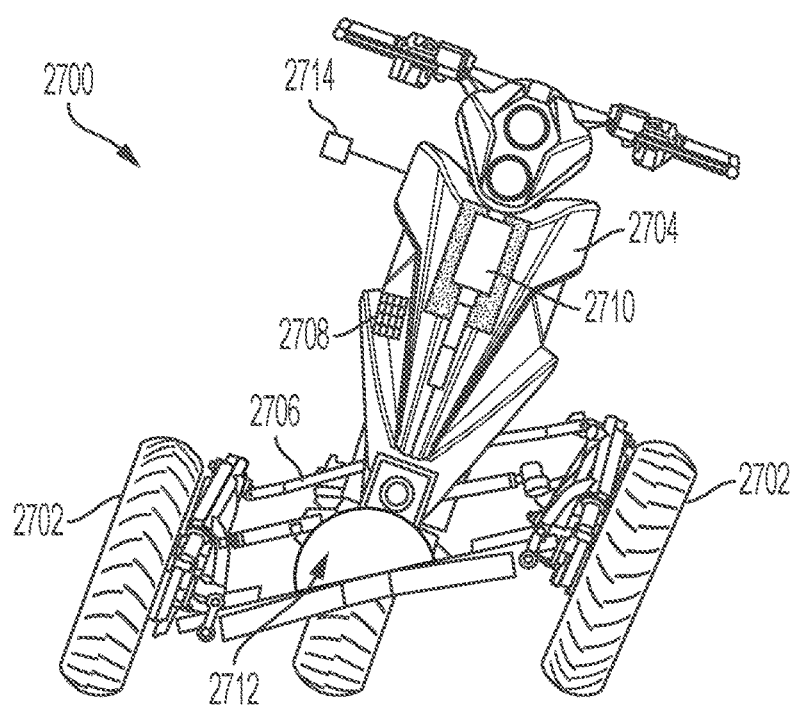
FIG. 30 is yet another front view of the vehicle of FIG. 27, depicting the vehicle in a tilted position.
Figure 31:
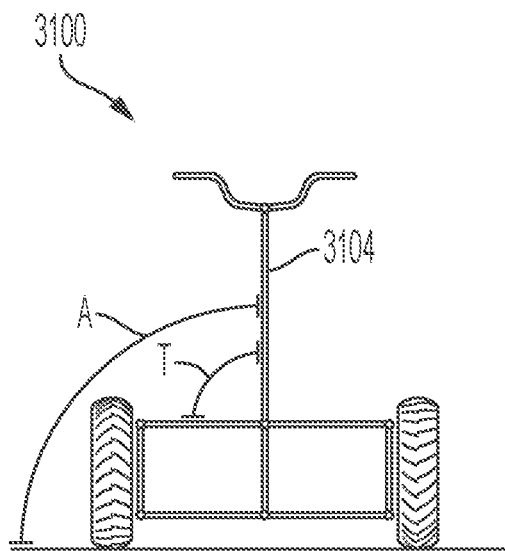
FIG. 31 is a schematic front view of yet another illustrative tiltable vehicle, in accordance with aspects of the present teachings.
Figure 32:
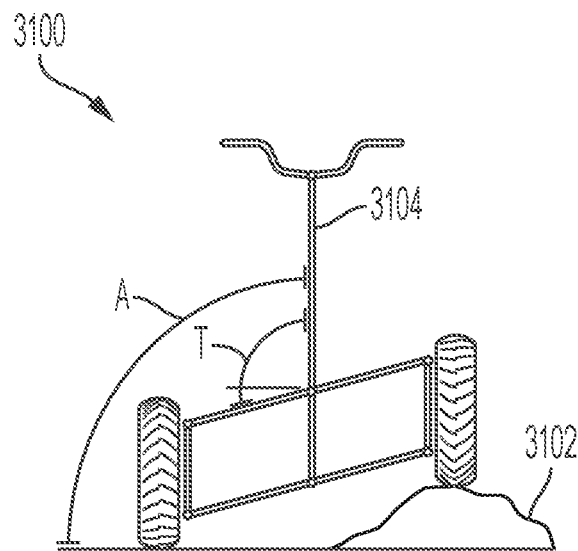
FIG. 32 is another schematic front view of the vehicle of FIG. 31, depicting the vehicle remaining upright while traversing an obstacle.
Figure 33:
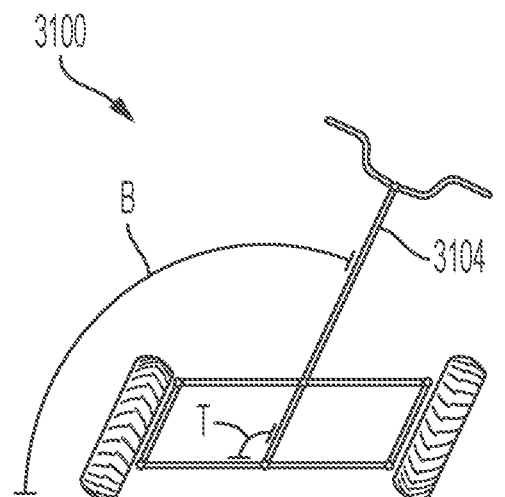
FIG. 33 is yet another schematic front view of the vehicle of FIG. 31, depicting the vehicle in a tilted position.
Figure 34:
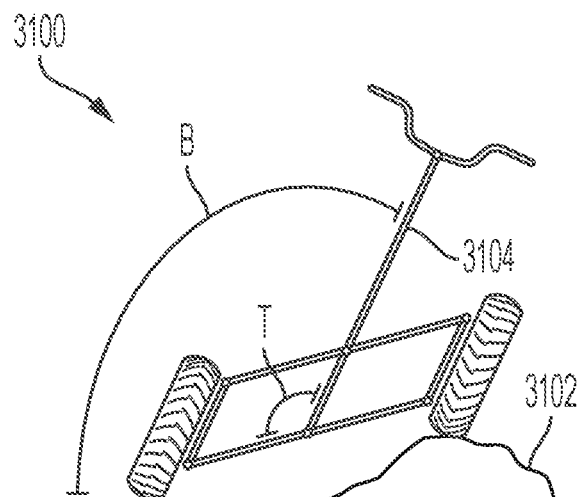
FIG. 34 is yet another schematic front view of the vehicle of FIG. 31, depicting the vehicle in a tilted position while traversing an obstacle.

Step 3504 of method 3500 includes causing the wheels of the vehicle (e.g., wheels 2702) to turn, e.g., using steering actuator 2710, thereby imparting a centrifugal force and causing a change in the net force vector on the vehicle (see FIG. 28). This step may be carried out by a user riding on the vehicle, e.g., using a steering mechanism such as handlebars or a steering wheel, by a remote user in a fly-by-wire scenario using a remote control device, or by an automated onboard controller. Accordingly, the net force vector will no longer be aligned with the median plane of the chassis.

Step 3506 of method 3500 includes sensing the misalignment between the median plane of the vehicle and the net force vector due to the centrifugal force and gravity. This step may be carried out by the tilt sensor (e.g., tilt sensor 2708).

Step 3508 of method 3500 includes causing the chassis (e.g., chassis 2704) to tilt to compensate for the increased centrifugal force, i.e., aligning the chassis such that the net force vector is in line with the median plane. As described above, the four bar linkage of the vehicle will cause the wheels to tilt with the chassis (e.g., to the same degree). See FIG. 29.

Step 3510 of method 3500 includes causing the wheels of the vehicle to return to a neutral position to come out of the turn began in step 3504. As in that step, the wheels may be steered by a user and/or a controller, e.g., using a steering actuator. This action causes the centrifugal force to be reduced or eliminated, thereby causing another misalignment of the net force vector with respect to the still-leaning chassis. See FIG. 30.

Step 3512 of method 3500 includes causing the chassis to tilt in an upright direction to compensate for the mismatch between the force vector and the median plane, e.g., using a controller to command the vehicle's tilt actuator. See FIG. 27.

B2. Steer Follows Lean (SFL)

In a second control scheme, vehicle steering follows vehicle tilt. In other words, the vehicle is tilted when entering a turn, and in response the wheels naturally steer and/or are caused to steer, such that the forces balance and the net force vector due to gravity and centrifugal force remains in line with the median plane of the tilting chassis. In other words, the chassis tilts first, or at least simultaneously with the wheels turning, and the wheels turn to a determined value that takes into account vehicle speed and tilt angle. At higher speeds, steering may be in a "free-to-caster" (FTC) mode, meaning no torque is applied and the wheels are left to move to a steering angle naturally. At lower speeds, steering may be completely controlled by a steering actuator (e.g., a servo motor). A transition zone or range between the lower speeds and the higher speeds, may also be defined, in which steering control is gradually transitioned from full torque to no torque, either linearly or nonlinearly. For example, below approximately 10 miles per hour (mph), wheels of the vehicle may be completely controlled by applying torque from a steering actuator. In this example, above approximately 20 mph the wheels may be completely FTC. Between approximately 10 mph and approximately 20 mph, control is transitioned from full-torque to zero-torque, e.g., using a clutch mechanism or the like. At extremely low speeds (e.g., less than one mph), vehicle tilting may be locked. These speeds are for illustration only, and any suitable speeds may be selected, depending on desired characteristics, vehicle capabilities, and operating conditions.

Figure 36:
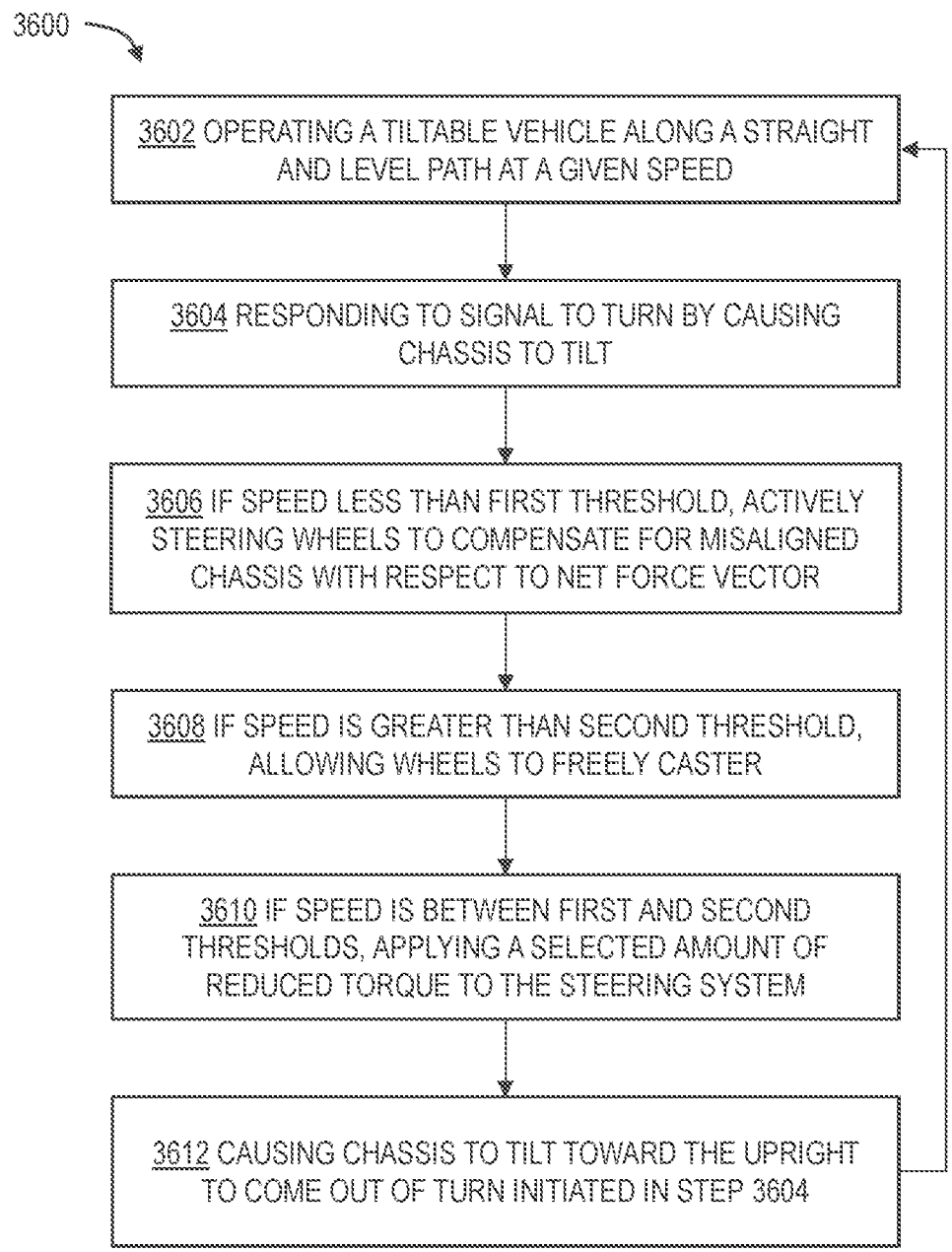
FIG. 36 is another flow chart depicting steps of an illustrative method for controlling a tiltable vehicle according to the present teachings.

FIG. 36 is a flowchart illustrating steps performed in an illustrative method 3600 implementing an SFL control scheme, and may not recite the complete process or all steps of the method. Although various steps of method 3600 are described below and depicted in FIG. 36, the steps need not necessarily all be performed, and in some cases may be performed simultaneously or in a different order than the order shown.

As explained above, an SFL control scheme may include three stages, depending on vehicle speed and/or other factors (e.g., vehicle loading). In this example, step 3602 of method 3600 includes operating the vehicle (e.g., vehicle 2700) along a straight path on a level surface at a given speed. In this situation, the net force vector is substantially equal to the force of gravity, and is aligned with the vertical chassis. See FIG. 27.

Step 3604 of method 3600 includes responding to a signal to turn the vehicle (e.g., from a user or an automated guidance system) by causing the chassis to tilt (e.g., using a tilt actuator) in a direction opposing the expected centrifugal force that will be caused by the turn and in an amount calculated to at least partially cause the turn to occur. A mismatch will occur between the net force vector (due to centrifugal force and gravity) and the median plane of the chassis. See FIG. 30.

If the speed of the vehicle is below a selected first threshold, then step 3606 of method 3600 includes causing the wheels to be steered (e.g., by issuing commands from a controller to a steering actuator) such that the net force vector aligns with the median plane, and the desired turning path is substantially followed. Below the selected first speed threshold, the vehicle may be referred to as operating in a dual input or dual control mode (i.e., tilt and steering are both controlled actively). See FIG. 29.

If the speed of the vehicle is above a selected second threshold, then step 3608 of method 3600 includes allowing the wheels to freely caster, i.e., applying zero additional torque to the wheels, thereby permitting the wheels to find their natural positions as a result of the vehicle's tilt. Above the selected second speed threshold, the vehicle may be referred to as operating in a free-to-caster or FTC mode (i.e., only tilt is controlled actively). See FIG. 29.

If the speed of the vehicle is between the first and second thresholds, then step 3610 of method 3600 includes applying a selected amount of torque to the steering system to maintain the turn and at least partially prevent wheel scrub with respect to the support surface. In this transition zone or transition range from full torque to zero torque, the level of torque applied to the steering may be proportional to vehicle speed (e.g., linearly related to speed or nonlinearly related to speed), depending on desired characteristics. See FIG. 29.

Step 3612 of method 3600 includes causing the tilt of the vehicle to return to a neutral position to come out of the turn began in step 3604. Depending on speed, as described above, the wheels may be steered more or less actively to assist and maintain alignment of the net force vector. See FIG. 30.

At very low speeds, e.g., below a third threshold (lower than the first and second thresholds), chassis tilt may be held constant or locked in place, such that only wheel steering may be utilized to achieve a selected vehicle path. See FIG. 28.

In some examples, aspects of methods 3500 and 3600 may be combined, e.g., such that the vehicle follows an LFS scheme when below the first speed threshold and a FTC scheme above the second threshold.

B3. Correcting for Terrain

Regardless of the control scheme, it may be instructive to describe how vehicles and control systems as described herein may be configured to handle (automatically) terrain changes and minor obstacles, i.e., non-planar travel surfaces. See FIGS. 31-34.

In general, a vehicle 3100 encountering an obstacle 3102 under one wheel or the other will be caused to tilt out of its commanded tilt value or range, causing instability of the vehicle. Vehicle stability is maintained and controlled by leaning a chassis 3104 of the vehicle relative to a wheel linkage 3106, thereby permitting the wheel linkage to tilt as a result of the obstacle, while maintaining the angle of the chassis with respect to a horizontal plane (e.g., a plane orthogonal to the force of gravity, or the idealized planar travel surface). This is accomplished by maintaining an alignment between the net force vector and the median plane of the chassis, as measured by the tilt sensor(s) of the vehicle.

For example, vehicle 3100 may be traveling either in a straight line (see FIG. 31) or in a turn (see FIG. 33), when obstacle 3102 is encountered. In either case, the obstacle initially causes chassis 3104 to tilt out of alignment with the net force vector. The controller of the vehicle compensates for this misalignment by adjusting the tilt angle of the chassis until the net force vector again aligns with the median plane. See FIGS. 32 and 34. As depicted, an initial angle A, B of the chassis with respect to horizontal is maintained by the control system, while a linkage displacement angle T changes based on the terrain. Once the obstacle is overcome, the chassis will tilt again, and the control system will adjust the tilt to compensate, returning to the original configuration.

Terrain compensation may result in difficulty maintaining a desired path. Accordingly, regardless of mode, the control system may be configured to selectively apply torque to the steering system to handle the dynamic conditions.

C. Illustrative Combinations and Additional Examples

This section describes additional aspects and features of tiltable vehicles and their control systems, presented without limitation as a series of paragraphs, some or all of which may be alphanumerically designated for clarity and efficiency. Each of these paragraphs may be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A vehicle comprising:
a pair of wheels coupled to a tiltable central frame by a four-bar linkage configured such that the pair of wheels and the central frame are configured to tilt in unison with respect to a median plane of the central frame;
a sensor configured to detect directional information regarding a net force vector applied to the central frame, wherein the net force vector is determined by gravity in combination with any applicable centrifugal force applied to the central frame;
a first actuator operatively coupled to the central frame and configured to selectively tilt the central frame;
a second actuator operatively coupled to the pair of wheels and configured to selectively steer the pair of wheels; and
a controller including processing logic configured to selectively control the first actuator and the second actuator in response to the directional information from the sensor to automatically maintain the net force vector in alignment with the median plane of the central frame.

A1. The vehicle of A0, wherein the sensor comprises an accelerometer.

A2. The vehicle of A0 or A1, wherein the first actuator comprises a servo motor.

A3. The vehicle of any one of paragraphs A0 through A2, wherein the controller is configured to control the first actuator independently of the second actuator.

A4. The vehicle of any one of paragraphs A0 through A3, wherein the processing logic of the controller is further configured to respond to a requested travel path of the vehicle by controlling the second actuator to steer the wheels and then to control the first actuator to tilt the central frame in response to a resulting misalignment between the net force vector and the median plane of the central frame.

A5. The vehicle of any one of paragraphs A0 through A4, wherein the processing logic of the controller is further configured to respond to a requested travel path of the vehicle by controlling the first actuator to tilt the central frame and then to control the second actuator to steer the wheels in response to a resulting misalignment between the net force vector and the median plane of the central frame.

A6. The vehicle of any one of paragraphs A0 through A5, wherein the processing logic of the controller is further configured to permit the pair of wheels to freely caster when a speed of the vehicle is above a selected threshold.

A7. The vehicle of A6, wherein the processing logic of the controller is further configured to control the second actuator to apply a selected amount of steering torque to the pair of wheels when the speed of the vehicle is less than the selected threshold.

A8. The vehicle of A7, wherein the selected threshold is defined as a first threshold, and the selected amount of steering torque is linearly related to the speed of the vehicle when the speed is below the first threshold and above a second threshold.

A9. The vehicle of any one of paragraphs A0 through A8, further comprising a handlebar operatively coupled to the pair of wheels.

A10. The vehicle of any one of paragraphs A0 through A9, wherein the pair of wheels is coupled to the central frame at a first end, the vehicle further comprising a third wheel coupled to an opposite, second end of the central frame.

A11. The vehicle of A10, wherein the third wheel is coupled to the second end at a pivotable joint.

A12. The vehicle of A11, wherein pivoting of the third wheel about the pivotable joint is damped by a spring disposed between the third wheel and the central frame.

B0. A method for automatically operating a tiltable vehicle, the method comprising:
sensing a net force vector on a central chassis of a wheeled vehicle, the central chassis coupled to a pair of laterally disposed wheels by a four-bar linkage assembly, wherein the central chassis is tiltable from side to side and the four-bar linkage assembly is configured to tilt the wheels in unison with the central chassis, and wherein the central chassis defines a median plane;
in response to receiving information relating to a desired travel path, comparing a speed of the vehicle to a first threshold and a second threshold greater than the first threshold; and
in response to the speed of the vehicle being less than the first threshold, turning the vehicle by simultaneously and automatically steering the wheels and causing a tilting of the central chassis, such that a misalignment between the net force vector and the median plane is minimized.

B1. The method of B0, further comprising:
in response to the speed of the vehicle being greater than the second threshold, automatically causing the central chassis to tilt to turn the vehicle, and, allowing the pair of wheels to freely caster.

B2. The method of B0 or B1, further comprising:
in response to the speed of the vehicle being between the first threshold and the second threshold, automatically actively steering the wheels by applying a selected amount of torque corresponding to the speed of the vehicle.

B3. The method of B2, wherein the selected amount of torque is linearly proportional to the speed of the vehicle.

B4. The method of B2, wherein the selected amount of torque corresponds to the speed of the vehicle in a nonlinear relationship.

B5. The method of any one of paragraphs B0 through B4, further comprising: in response to one of the wheels encountering an obstacle and causing a misalignment between the net force vector and the median plane, automatically compensating by causing the central chassis to tilt into alignment with the net force vector.

B6. The method of B5, further comprising causing the central chassis to return to an original orientation after clearing the obstacle B7. The method of any one of paragraphs B0 through B6, further comprising propelling the vehicle using a powered third wheel coupled to the central chassis.

B8. The method of any one of paragraphs B0 through B7, wherein the net force vector is a result of gravity and a centrifugal force.

Advantages, Features, and Benefits

The different embodiments and examples of the vehicles and controls described herein provide several advantages over known solutions. For example, illustrative embodiments and examples described herein allow automated or semiautomated control of a wheeled vehicle while maximizing rider comfort.

Additionally, and among other benefits, illustrative embodiments and examples described herein automatically stabilize a robotic or other vehicle by tilting the vehicle from side to side to compensate for centrifugal forces during transit.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A vehicle comprising:
    first and second wheels coupled to a central frame by a four-bar linkage which allows the wheels and the central frame to tilt with respect to a median plane of the central frame;
    a sensor configured to detect directional information regarding a net force vector applied to the central frame;
    a first actuator operatively coupled to the central frame and configured to selectively tilt the central frame;
    a second actuator operatively coupled to the wheels and configured to selectively steer the wheels; and
    a controller including processing logic configured to selectively control the first actuator and the second actuator in response to the directional information from the sensor to automatically maintain the net force vector in alignment with the median plane of the central frame;
    wherein the processing logic of the controller is further configured to control the second actuator to automatically (a) apply a selected amount of steering torque to the wheels when a speed of the vehicle is less than a first threshold, and (b) permit the wheels to caster freely when the speed of the vehicle is above the first threshold; and
    wherein the four-bar linkage includes a top suspension bar, a bottom suspension bar, a left suspension bar and a right suspension bar, and wherein the top suspension bar includes a pair of upper suspension arms each having an inner end coupled together at a first pivot element.

2. The vehicle of claim 1, wherein the four-bar linkage includes a central element rigidly coupled to the frame, and wherein the first pivot element is attached to the central element.

3. The vehicle of claim 1, wherein the four-bar linkage includes a central element rigidly coupled to the frame, and wherein the central element includes the first pivot element.

4. The vehicle of claim 1, wherein the bottom suspension bar includes a pair of lower suspension arms each having an inner end rotatably coupled together at a second pivot element.

5. The vehicle of claim 4, wherein the four-bar linkage includes a central element rigidly coupled to the frame, and wherein the first pivot element and the second pivot element are rigidly coupled to the central element.

6. The vehicle of claim 5, wherein a first one of the pair of upper suspension arms extends parallel to a first one of the pair of lower suspension arms, and a second one of the pair of upper suspension arms extends parallel to a second one of the pair of lower suspension arms.

7. A vehicle comprising:
    first and second wheels coupled to a chassis by a four-bar linkage which enables the wheels and the chassis each to tilt with respect to a median plane defined by the chassis;
    a sensor configured to detect lateral deflection of a net force vector on the chassis;
    a tilting actuator operatively coupled to the chassis and configured to selectively tilt the chassis; and
    a motorized steering actuator operatively coupled to the wheels and configured to selectively steer the wheels;
    wherein at least one of the tilting actuator and the steering actuator are configured to return the net force vector to substantial alignment with the median plane of the chassis, in response to the sensor detecting lateral deflection of the net force vector;
    wherein the four-bar linkage includes a top suspension bar, a bottom suspension bar, a left suspension bar and a right suspension bar, and wherein the top suspension bar includes a pair of upper suspension arms each having an inner end coupled together at a first pivot element; and
    a controller, wherein processing logic of the controller is configured to control the steering actuator to automatically (a) apply a selected amount of steering torque to the wheels when a speed of the vehicle is less than a first threshold, and (b) permit the wheels to caster freely when the speed of the vehicle is above the first threshold.

8. The vehicle of claim 7, wherein the linkage includes a central element rigidly coupled to the chassis, and wherein the first pivot element is attached to the central element.

9. The vehicle of claim 7, wherein the linkage includes a central element rigidly coupled to the chassis, and wherein the central element includes the first pivot element.

10. The vehicle of claim 7, wherein the bottom suspension bar includes a pair of lower suspension arms each having an inner end coupled together at a second pivot element.

11. The vehicle of claim 10, wherein the four-bar linkage includes a central element rigidly coupled to the chassis, and wherein the first pivot element and the second pivot element are rigidly coupled to the central element.

12. The vehicle of claim 11, wherein a first one of the pair of upper suspension arms extends parallel to a first one of the pair of lower suspension arms, and a second one of the pair of upper suspension arms extends parallel to a second one of the pair of lower suspension arms.

\* \* \* \* \*